(12) United States Patent
Darbyshire

(10) Patent No.: US 11,447,252 B2
(45) Date of Patent: Sep. 20, 2022

(54) AIRCRAFT SEAT WITH SEPARATED SEAT BACK AND SEAT PAN

(71) Applicant: B/E Aerospace, Inc., Winston-Salem, NC (US)

(72) Inventor: Martin R. Darbyshire, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 329 days.

(21) Appl. No.: 16/590,122

(22) Filed: Oct. 1, 2019

(65) Prior Publication Data
US 2021/0094690 A1    Apr. 1, 2021

(51) Int. Cl.
*B64D 11/06*    (2006.01)

(52) U.S. Cl.
CPC ........ *B64D 11/064* (2014.12); *B64D 11/0641* (2014.12); *B64D 11/0646* (2014.12); *B64D 11/0647* (2014.12)

(58) Field of Classification Search
CPC .............. B64D 11/0641; B64D 11/064; B64D 11/0646; B64D 11/0647; B64D 11/0698; B60N 2/12; B60N 2/203
USPC ................................. 297/234, 342, 341, 101
See application file for complete search history.

(56) References Cited

U.S. PATENT DOCUMENTS

| | | | |
|---|---|---|---|
| 3,902,755 A * | 9/1975 | Sirot | B64D 11/064 297/339 |
| 4,321,716 A * | 3/1982 | Shrock | A47C 17/1756 5/47 |
| 4,563,784 A * | 1/1986 | Shrock | A47C 17/17 5/47 |
| 5,787,522 A * | 8/1998 | Swihart | A47C 17/1655 5/118 |
| 7,975,962 B2 | 7/2011 | Jacob | |
| 7,997,531 B2 * | 8/2011 | Bettell | B64D 11/0641 244/118.6 |
| 8,177,165 B2 | 5/2012 | Bettell | |
| 9,056,683 B2 | 6/2015 | Cho | |
| 10,315,772 B2 * | 6/2019 | Ehrmann | B64D 11/0641 |

(Continued)

FOREIGN PATENT DOCUMENTS

| | | |
|---|---|---|
| AU | 2002355368 A1 | 6/2003 |
| EP | 3514062 A1 | 7/2019 |

(Continued)

OTHER PUBLICATIONS

Search Report dated Jul. 24, 2020 for European Application No. 19216731.0.

*Primary Examiner* — Richard R. Green
*Assistant Examiner* — Madison Elizabeth Dittner
(74) *Attorney, Agent, or Firm* — Suiter Swantz pc llo

(57) ABSTRACT

An aircraft seat may include a seat back coupled to a shell of one or more passenger compartment shell sections of a passenger compartment installed within an aircraft cabin. The aircraft seat may include a seat pan coupled to a floor of the aircraft cabin proximate to an ottoman installed within the passenger compartment. The seat back may be in contact with a surface of the seat pan when the aircraft seat is in a first position. The seat back may be separated from the surface of the seat pan when the aircraft seat is in a second position. The seat back may be configured to move independently of the seat pan when the aircraft seat transitions between the first position and the second position.

16 Claims, 18 Drawing Sheets

(56) References Cited

U.S. PATENT DOCUMENTS

| | | | |
|---|---|---|---|
| 10,358,220 B2 | 7/2019 | Carlioz | |
| 10,358,222 B2 | 7/2019 | Army et al. | |
| 2010/0025530 A1 | 2/2010 | Ferry et al. | |
| 2010/0301162 A1 | 12/2010 | Hankinson | |
| 2014/0246886 A1* | 9/2014 | Savard | B64D 11/0641 |
| | | | 297/62 |
| 2015/0284087 A1* | 10/2015 | Henshaw | B64D 11/064 |
| | | | 297/316 |
| 2016/0090181 A1* | 3/2016 | Breuer | B64D 11/0641 |
| | | | 5/20 |

FOREIGN PATENT DOCUMENTS

| | | | |
|---|---|---|---|
| WO | 2014064525 A2 | 5/2014 | |
| WO | 2018169575 A1 | 9/2018 | |

* cited by examiner

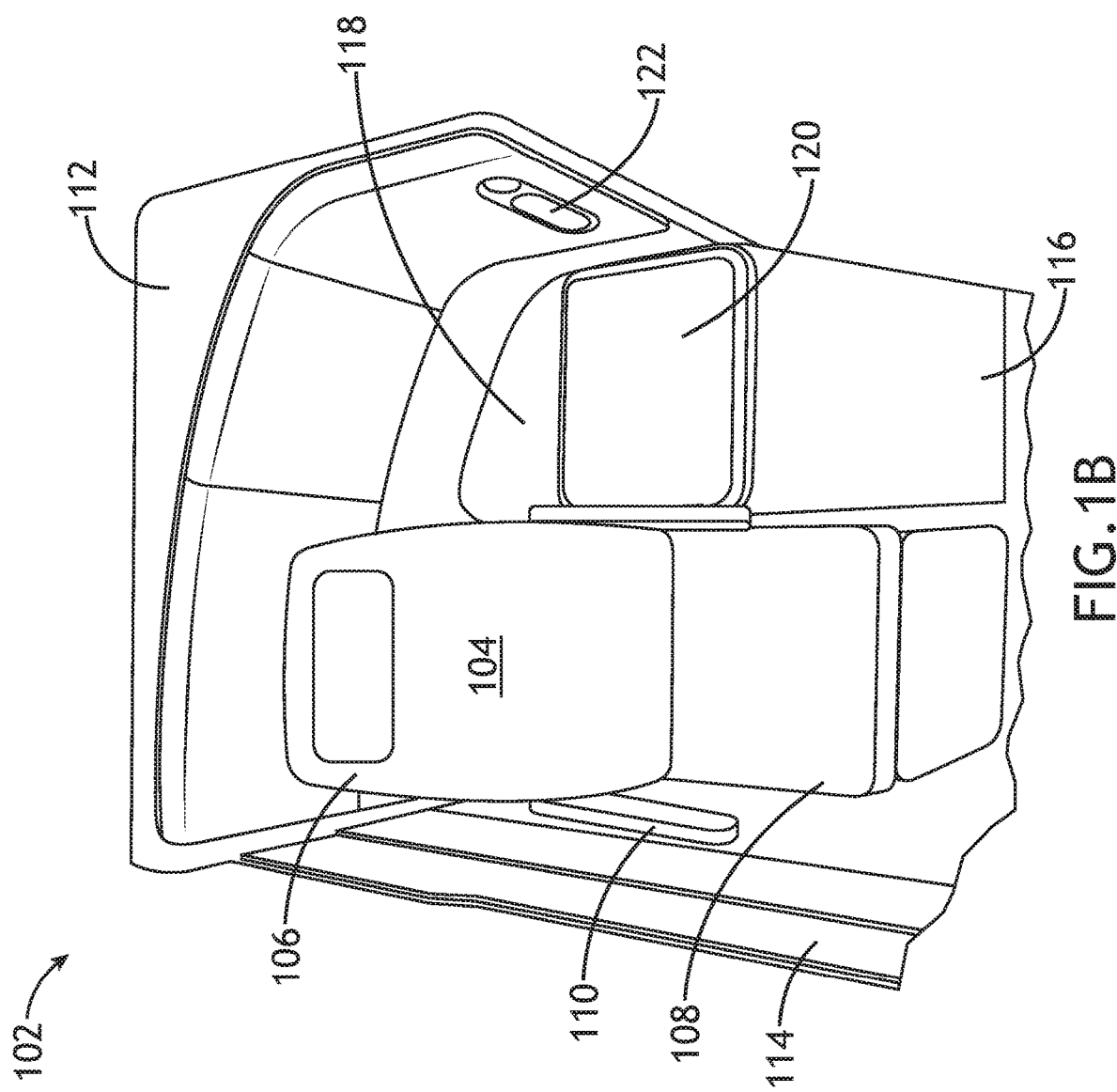

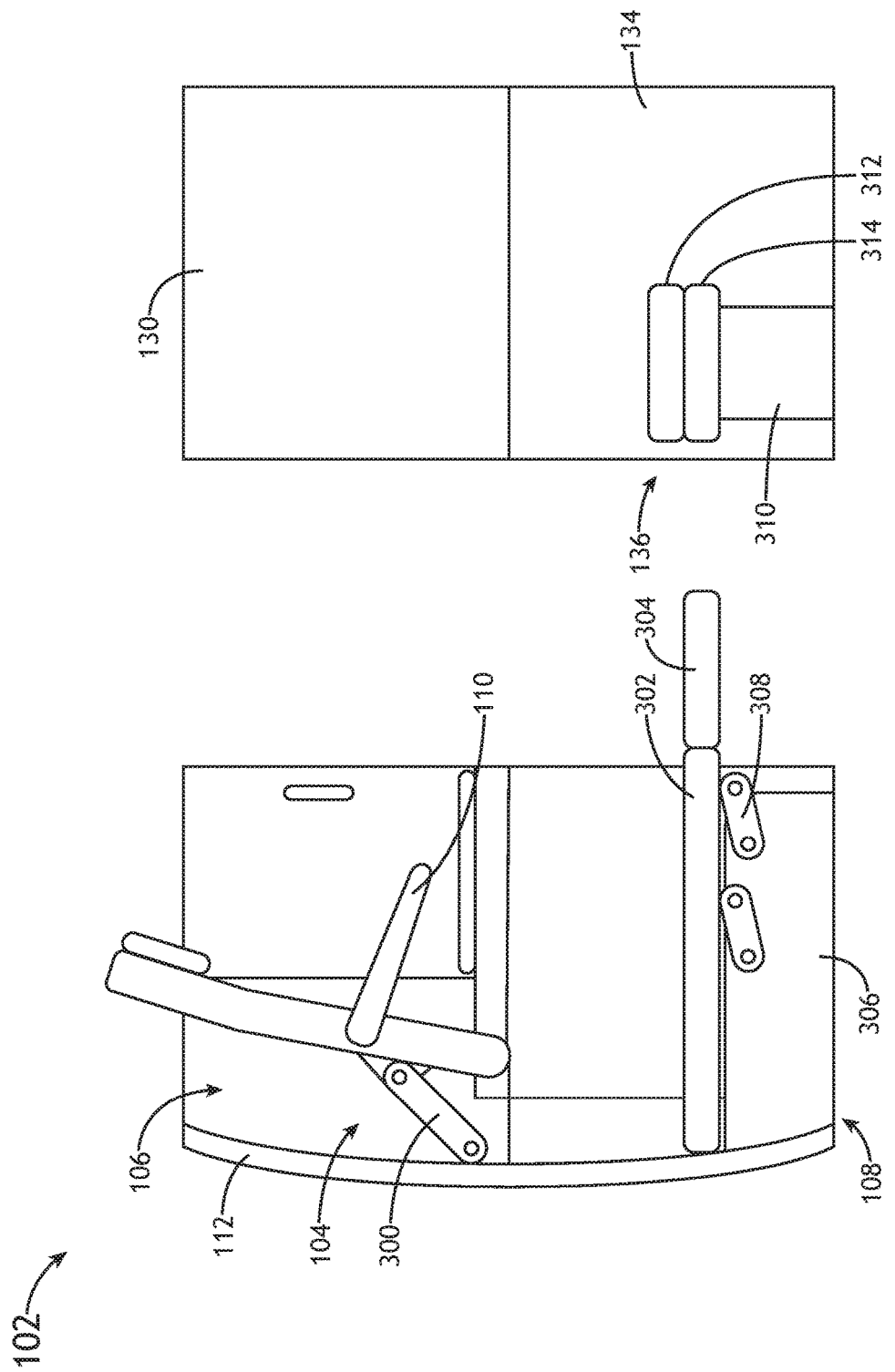

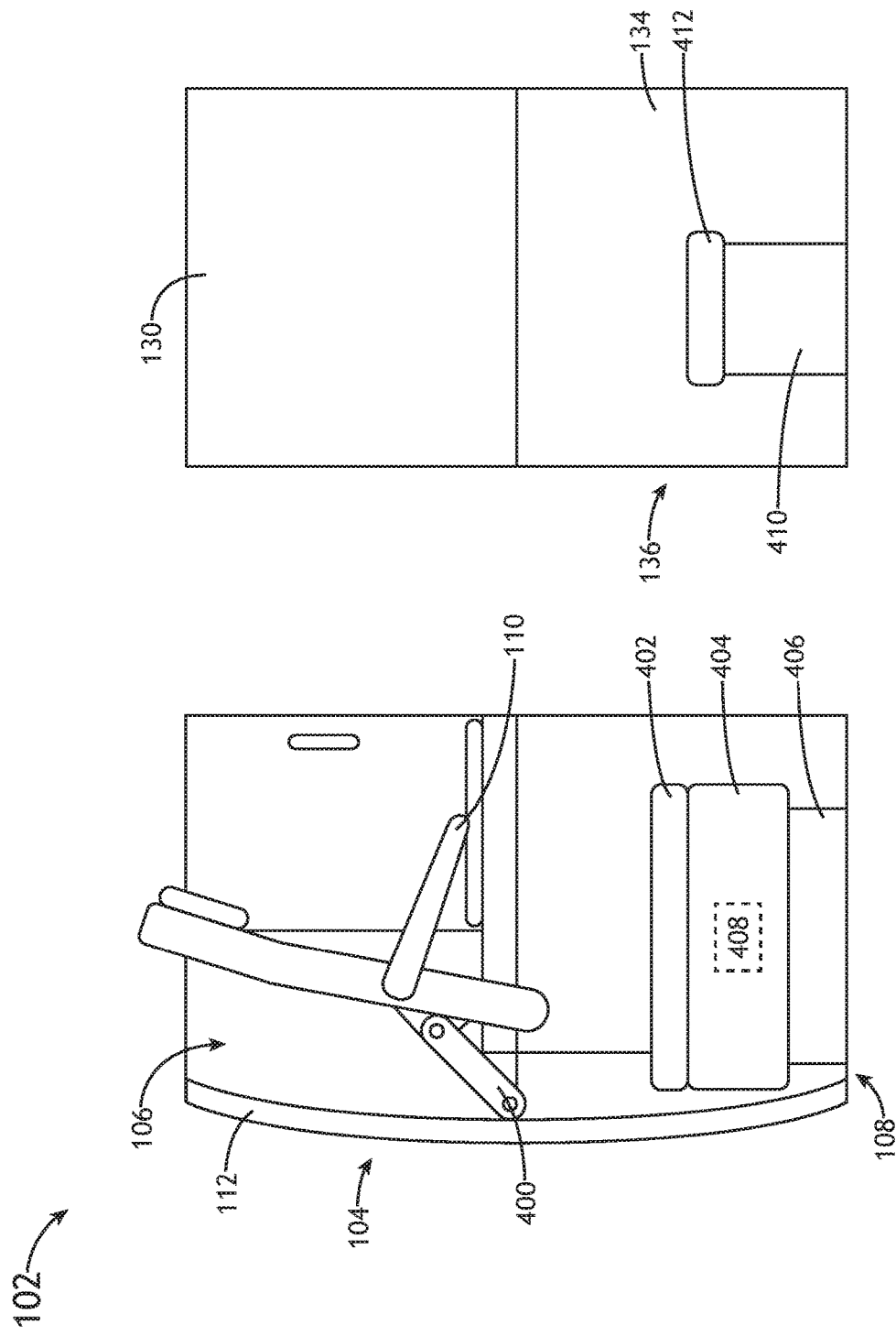

AIRCRAFT SEAT WITH SEPARATED SEAT BACK AND SEAT PAN

BACKGROUND

In commercial transportation vehicles such as passenger aircraft, a business class seat may incorporate a number of actuating components to bring a seat back and a seat bottom (and, in cases, a seat leg-rest) into a lie-flat position to form a bed. In some cases, the seat back may include a contoured profile that, while desirable when the business class seat is in an upright position, reduces comfort when the seat is in the lie-flat position. Where a passenger compartment houses the business class seat, the arrangement of the seat back and the seat bottom of the business class seat may be such that the space in the passenger compartment is greatly reduced when the business class seat is in the lie-flat position versus the upright position.

SUMMARY

An aircraft seat is disclosed, in accordance with one or more embodiments of the disclosure. The aircraft seat may include a seat back coupled to a shell of one or more passenger compartment shell sections of a passenger compartment installed within an aircraft cabin. The aircraft seat may include a seat pan coupled to a floor of the aircraft cabin proximate to an ottoman installed within the passenger compartment. The seat back may be in contact with a surface of the seat pan when the aircraft seat is in a first position. The seat back may be separated from the surface of the seat pan when the aircraft seat is in a second position. The seat back may be configured to move independently of the seat pan when the aircraft seat transitions between the first position and the second position.

In some embodiments, the seat pan further includes at least one seat pan cushion configured to align with at least one ottoman cushion of the ottoman when the aircraft seat is in the second position.

In some embodiments, the at least one seat pan cushion may include a first seat pan cushion and a second seat pan cushion. The first seat pan cushion and the second seat pan cushion may be unaligned when the aircraft seat is in the first position. The first seat pan cushion and the second seat pan cushion may be aligned when the aircraft seat is in the second position.

In some embodiments, the second seat pan cushion and the first seat pan cushion may be set at an angle relative to the first seat pan cushion when the aircraft seat is in the first position.

In some embodiments, the second seat pan cushion and the first seat pan cushion may be stacked on the first seat pan cushion when the aircraft seat is in the first position.

In some embodiments, the first seat pan cushion and the second seat pan cushion may be aligned with the at least one ottoman cushion when the aircraft seat is in the second position.

In some embodiments, the at least one ottoman cushion may include a first ottoman cushion and a second ottoman cushion. The first seat pan cushion and the second seat pan cushion may be aligned with a first ottoman cushion and a second ottoman cushion when the aircraft seat is in the second position. The first ottoman cushion and the second ottoman cushion may be unaligned with the aircraft seat is in the first position.

In some embodiments, the second ottoman cushion may be stacked on the first ottoman cushion when the aircraft seat is in the first position.

In some embodiments, the seat back and the seat pan may be separated by a select distance when the aircraft seat is in the second position.

In some embodiments, the seat pan may be configured to extend into a space of the passenger compartment. The space may be bounded in part by the shell of the passenger compartment and a plane defined by a surface of the seat back.

In some embodiments, the first position may include at least one of an upright position or a recline position. The second position may include a lie-flat position.

In some embodiments, the seat pan may be configured to rotate about an axis through a side of a seat pan base to transition between the upright position and the recline position.

In some embodiments, the seat pan may be configured to rotate about the axis through the side of the seat pan base to transition between the upright position and the recline position during a translation of the aircraft seat.

In some embodiments, at least one of the seat back or the seat pan may be configured to move independently of the ottoman when the aircraft seat transitions between the first position and the second position.

A passenger compartment of an aircraft cabin is disclosed, in accordance with one or more embodiments of the disclosure. The passenger compartment may include one or more passenger compartment shell sections. The passenger compartment may include an ottoman. The passenger compartment may include an aircraft seat. The aircraft seat may include a seat back coupled to a shell of the one or more passenger compartment shell sections. The passenger compartment may include a seat pan coupled to a floor of the aircraft cabin proximate to the ottoman. The seat back may be in contact with a surface of the seat pan when the aircraft seat is in a first position. The seat back may be separated from the surface of the seat pan when the aircraft seat is in a second position. The seat back may be configured to move independently of the seat pan when the aircraft seat transitions between the first position and the second position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1B illustrates a perspective view of a passenger compartment housing an aircraft seat with a separated seat back and seat pan, in accordance with one or more embodiments of the disclosure;

FIG. 3D illustrates a side view of a passenger compartment housing an aircraft seat with a separated seat back and seat pan, in accordance with one or more embodiments of the disclosure;

FIG. 4D illustrates a side view of a passenger compartment housing an aircraft seat with a separated seat back and seat pan, in accordance with one or more embodiments of the disclosure;

DETAILED DESCRIPTION OF THE INVENTION

Figure 1A:
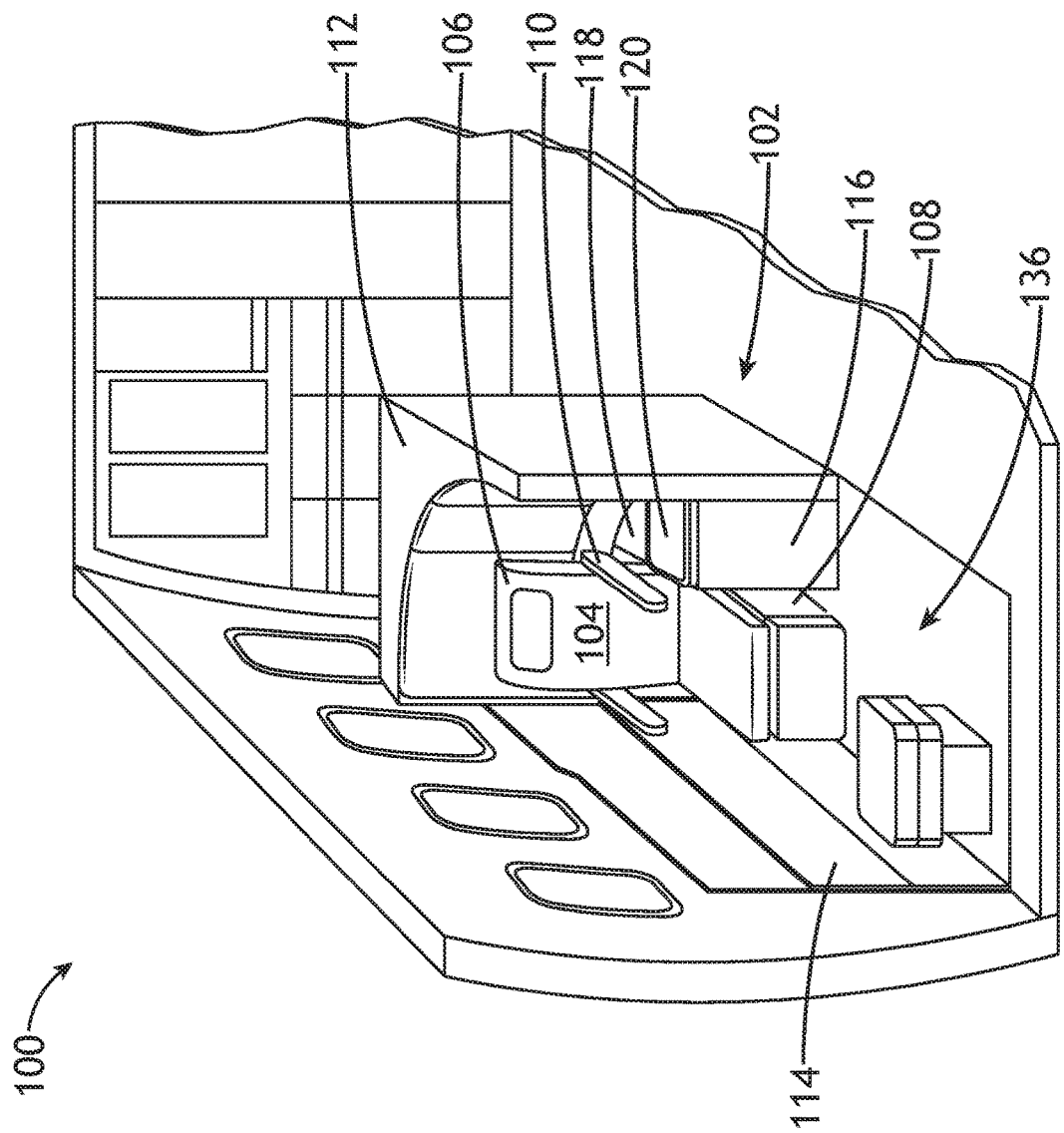
FIG. 1A illustrates a perspective view of an aviation environment including a passenger compartment housing an aircraft seat with a separated seat back and seat pan, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-6 generally illustrate an aircraft seat with a separated seat back and seat pan, in accordance with one or more embodiments of the disclosure.

A conventional business class seat may include one or more mechanical linkages joining the seat back and the seat pan, where the seat back hinges from the frame of the seat pan when the business class seat transitions from an upright position to a recline position or a lie-flat position.

When transitioning between the upright position and a lie-flat position, the traditional business class seat may translate forward through a series of defined postural positions until becoming a bed in the lie-flat position. The seat back may include a contoured surface that, while desirable when the business class seat is used in the upright position, may reduce comfort of the occupying passenger when the business class seat is used in the lie-flat position.

This translation may decrease an amount of passenger space remaining in a passenger compartment housing the business class seat. The passenger compartment may have a curved shell to the rear of the seat to provide an occupying passenger with privacy, but the business class seat and the shell are independent monuments within a passenger aircraft housing the business class seat and enclosing shell.

As such, it would be beneficial to provide an aircraft seat with a separated seat back and seat pan, where the seat back and the seat pan are independently supported within the passenger compartment. Having the seat back and the seat pan be independently supported may minimize the reduced comfort that may result from the seat back being used as a portion of a bed. In addition, having the seat back and the seat pan be independently supported may minimize the amount of passenger space lost when the business class seat is in the lie-flat position.

FIGS. 1A-1C and 2A-2C generally illustrate an aviation environment 100 with a passenger compartment 102 housing an aircraft seat 104, in accordance with one or more embodiments of the disclosure. For example, the aviation environment 100 may include, but is not limited to, an aircraft 100 or an aircraft cabin 100.

The aircraft seat 104 may include a seat back 106. The seat back 106 may be contoured (e.g., wider and sculpted) to support an occupying passenger when the aircraft seat 104 is in an upright position or a recline position. The seat back 106 may include a frame (e.g., a lightweight composite shell) with one or more cushions. It is noted herein, however, that the seat back 106 may include a frame (e.g., a lightweight composite shell) with a mesh netting configured to provide a return force against the back of an occupying passenger when the aircraft seat 104 is in the upright position or the recline position.

The aircraft seat 104 include may include a seat pan 108. The seat pan 108 may include a frame (e.g., a lightweight composite shell) with one or more cushions. The seat pan 108 may include a seat base. The seat base (e.g., a seat base 306, as illustrated in FIGS. 3A-3E) may be configured to translate forward and rearward. The base (e.g., a seat base 406, as illustrated in FIGS. 4A-4E) may be configured to translate forward and rearward, and may be configured to rotate (e.g., tilt a rear edge downward) about an axis through a side of the base when the aircraft seat 104 is transitioned into the recline position. For example, the base may be configured to rotate about the axis during the translation of the aircraft seat 104 forward and/or rearward. It is noted herein that the frame may be coupled to the seat base, or may be integrated into the seat base.

The seat back 106 and the seat pan 108 may share an interlocking assembly that engages when the aircraft seat 104 is in the upright position or the recline position. For example, the interlocking assembly may include a tab-and-groove assembly, where a set of tabs on the seat back 106 are keyed to a corresponding set of grooves in the seat pan 108. In this regard, the seat back 106 may move with the seat pan 108 through whatever range of articulation the seat pan 108 may have when the aircraft seat 104 is in the upright position or the reclined position.

The aircraft seat 104 may include a set of armrests 110. The armrests 110 may be fabricated from a frame (e.g., a lightweight composite shell) with a foam insert and/or a rubber (e.g., urethane-based) over-molding. The armrests 110 may rotate about an axis through a rotatable joint coupling the armrests 110 to the seat back 106 (e.g., coupling to the frame).

The aircraft seat 104 may be translatable (e.g., trackable or slidable) into a position including, but not limited to, a forward (or fore) position and/or a rearward (or aft) position. The aircraft seat 104 may be rotatable about an axis crosswise through the aircraft seat 104 into a position including, but not limited to, an upright or raised position, a reclined position, and/or a lie-flat or bed position. The aircraft seat 104 may be rotatable about an axis (e.g., swivelable) through the aircraft seat 104 into a position including, but not limited to, an inboard position, a forward-facing position (or rear-facing position, depending on seat placement within the passenger compartment 102), and/or an outboard position. The aircraft seat 104 may be fully positionable between the outer limits of motion as defined by the moveable components of the aircraft seat 104 (e.g., the seat back 106, the seat pan 108, or the like), and/or other monuments in the passenger compartment 102.

It is noted herein a combination of a fully upright position, a fully rearward (or fully forward position, depending on seat placement within the passenger compartment 102), and a fully forward-facing position (or fully rear-facing position, depending on seat placement within the passenger compartment 102) may be considered a taxi, takeoff, or landing (TTOL) position during select stages of flight, for purposes of the present disclosure. In addition, it is noted herein that any position that does not meet the above-defined requirements of the TTOL position may be considered a non-TTOL position, for purposes of the present disclosure. Further, it is noted herein the aircraft seat 104 may be translatable and/or rotatable from the TTOL position to a non-TTOL position, and/or vice versa.

The seat back 106 may be coupled to one or more passenger compartment shell sections. For example, the one or more passenger compartment shell sections may include, but are not limited to, a rear shell 112 or a side shell 114. A portion of the side shell 114 may include one or more partitions.

For example, the one or more partitions may be a vertically translating privacy divider. Although not shown, the one or more partitions may provide a private space and/or a communal area between multiple passengers within the passenger compartment 102 where the passenger compartment 102 includes multiple aircraft seats 104. It is noted herein that the passenger compartment 102 is illustrated in FIGS. 1A, 1B and 2A, 2B without a front shell (e.g., front shell 130, as illustrated in FIG. 1C or 2C) and a portion of a side shell 114 for purposes of clarity only, and should not be interpreted as a limitation on the present disclosure but merely an illustration.

The passenger compartment 102 may include one or more monuments 116. For example, the one or more monuments 116 may include, but are not limited to, a side stand, a table, or the like. A monument 116 may include an accessible surface 118 for a passenger occupying the passenger compartment 102. An actuatable tray 120 (e.g., translatable, foldable, extendable, or the like) may be positioned proximate to the accessible surface 118 (e.g., on top, in front, underneath in a cavity defined by a space within the monument 116, or the like).

The passenger compartment 102 may include one or more lights 122. For example, the one or more lights 122 may be positioned proximate to the rear shell 112 and/or the side shell 114 (e.g., positioned on the accessible surface 118). By way of another example, the one or more lights 122 may be secured to and/or at least be partially inset within the rear shell 112 and/or the side shell 114.

The passenger compartment 102 may include one or more stowage compartments 124, 128. For example, a stowage compartment 124 may include a door 126, and may be configured to receive and hold (e.g., contain, secure, or the like) one or more pieces of carry-on luggage. By way of another example, a stowage compartment 128 may be configured to receive paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), passenger amenities, or the like. The one or more stowage compartments 124, 128 may be secured to and/or at least be partially inset within the rear shell 112, the side shell 114, a front shell 130, the one or more monuments 116, or the like.

The passenger compartment 102 may include one or more passenger in-flight entertainment devices (IFEs). For example, the one or more IFEs may include, but are not limited to, one or more displays 132 secured to and/or at least be partially inset within a shell (e.g., the front shell 130).

The passenger compartment 102 may include a footwell 134 for a passenger. For example, the footwell 134 may be positioned across from the aircraft seat 104 within the passenger compartment 102. One or more dimensions of the footwell 134 may be changed by transitioning the aircraft seat 104 between the upright position, the recline position, and/or the lie-flat position.

The passenger compartment 102 may include an ottoman 136. The ottoman 136 and the aircraft seat 104 (e.g., the seat pan 108) may be separated by a select distance. For example, the select distance may be approximately equal to a dimension (e.g., length) of a portion of the footwell 134. The ottoman 136 may be positioned within a second portion of the footwell 134. It is noted herein, however, that a portion of the ottoman 136 may be actuatable to a position outside of the footwell 134 (e.g., along a set of tracks or rails).

The ottoman 136 may be configured to translate and/or rotate about an axis through a sidewall of the ottoman to point a top surface to a passenger occupying the aircraft seat 104 or to a ceiling of the aircraft cabin 100. For example, where the ottoman 136 may be configured to both translate and rotate, the ottoman 136 may be configured to independently rotate and/or translate. By way of another example, where the ottoman 136 may be configured to both translate and rotate, a rotation may prevent further translation until the ottoman 136 is returned to a select position and/or a translation may prevent further rotation until the ottoman 136 is returned to a select position.

It is noted herein the aircraft seat 104 and/or the ottoman 136 may be integrated into existing passenger compartments 102. In addition, it is noted herein the aircraft seat 104 and/or the ottoman 136 may be configured to be operable in conjunction with existing convertible aircraft seat systems known in the art.

FIGS. 3A-3E illustrate the passenger compartment 102 including the aircraft seat 104 with the separated seat back 106 and the seat pan 108, in accordance with one or more embodiments of the disclosure.

The seat back 106 may be coupled to the passenger compartment 102 via a set of linkages 300. For example, the set of linkages 300 may include a four-bar linkage assembly 300. The seat back 106 may be coupled to the rear shell 112 of the passenger compartment 102 via the set of linkages 300. For example, the seat back 106 may actuate upward when transitioning between a recline position/an upright position and a lie-flat position via the set of linkages 300. The seat back 106 may be coupled to the side shell 114 of the passenger compartment 102. For example, the seat back 106 may actuate sideways when transitioning between a recline position/an upright position and a lie-flat position via the set of linkages 300. It is noted herein that actuating the seat back 106 upwards or sideways may provide an occupying passenger more head room when using the aircraft seat 104 in the lie-flat position.

The seat pan 108 may include a set of seat pan cushions. For example, the seat pan 108 may include a first seat pan cushion 302, where the first seat pan cushion 302 may form both a portion of the seat pan cushion (e.g., on which an occupying passenger may sit) when the aircraft seat 104 is in the upright position/recline position, as well as a bed cushion when the aircraft seat 104 is in the lie-flat position. For instance, the same surface (e.g., a top surface) of the first seat pan cushion 302 may be used by the occupying passenger when the aircraft seat 104 is in any of the upright position, the recline position, and the lie-flat position, such that it may not be necessary to flip the first seat pan cushion 302. By way of another example, the seat pan 108 may include a second seat pan cushion 304, where the second seat pan cushion 304 may be a bed infill cushion used when the aircraft seat 104 is in the lie-flat position. The second seat pan cushion 304 may be coupled (e.g., via a hinge proximate to a forward face of the seat pan 108) to the seat pan 108 at an angle relative to the first seat pan cushion 302 position (e.g., such that the seat pan cushions 302, 304 may be considered unaligned with each other).

The seat pan 108 may include a seat base 306. The seat base 306 may be coupled to one or more floor fittings within a floor of the aircraft cabin 100. The seat base 306 may be translatable within the passenger compartment 102 (e.g., via the one or more floor fittings and/or via one or more translatable brackets or rail assemblies coupled to the floor fittings). It is noted herein, however, that the seat base 306 may be fixed in place within the passenger compartment 102. The seat base 306 may be exposed or at least partially covered by a shroud. For example, the shroud may be formed from one or more shroud sections. It is noted herein, however, that the seat pan 108 may be directly coupled to the one or more floor fittings within the floor of the aircraft cabin 100.

The seat pan 108 may be coupled to the seat base 306 via a set of linkages 308. For example, the set of linkages 308 may include a four-bar linkage 308. By way of another example, the seat pan 108 may slightly tilt when transitioning between the recline position and the upright position via the set of linkages 308. By way of another example, the seat pan 108 may translate forward when transitioning between the recline position/the upright position and the lie-flat position via the set of linkages 308.

The ottoman 136 may include an ottoman base 310. The ottoman base 310 may be coupled to one or more floor fittings within a floor of the aircraft cabin 100. The ottoman base 310 may be translatable within the footwell 134 of the passenger compartment 102 (e.g., via the one or more floor fittings and/or via one or more translatable brackets or rail assemblies coupled to the floor fittings). It is noted herein, however, that the ottoman base 310 may be fixed in place within the footwell 134 of the passenger compartment 102. The ottoman base 310 may be exposed or at least partially covered by a shroud. For example, the shroud may be formed from one or more shroud sections. It is noted herein, however, that the ottoman base 310 may be directly coupled to the one or more floor fittings within the floor of the aircraft cabin 100.

The ottoman 136 may include a set of one or more ottoman cushions. For example, the ottoman 136 may include a first ottoman cushion 312, where the first ottoman cushion 312 may form both a portion of a foot rest for a passenger occupying the aircraft seat 104 while the aircraft seat 104 is in the upright position or the recline position, as well as a bed infill cushion used when the aircraft seat 104 is in the lie-flat position. For instance, different sides of the first ottoman cushion 312 may be used by the occupying passenger, depending on the position of the aircraft seat 104. By way of another example, the ottoman 136 may include a second ottoman cushion 314, where the second ottoman cushion 314 may be a bed cushion used when the aircraft seat 104 is in the lie-flat position. The first ottoman cushion 312 and the second ottoman cushion 314 may be stacked when the aircraft seat 104 is in the upright position or the recline position (e.g., such that the first ottoman cushion 312 and the second ottoman cushion 314 may be considered unaligned).

Figure 3A:
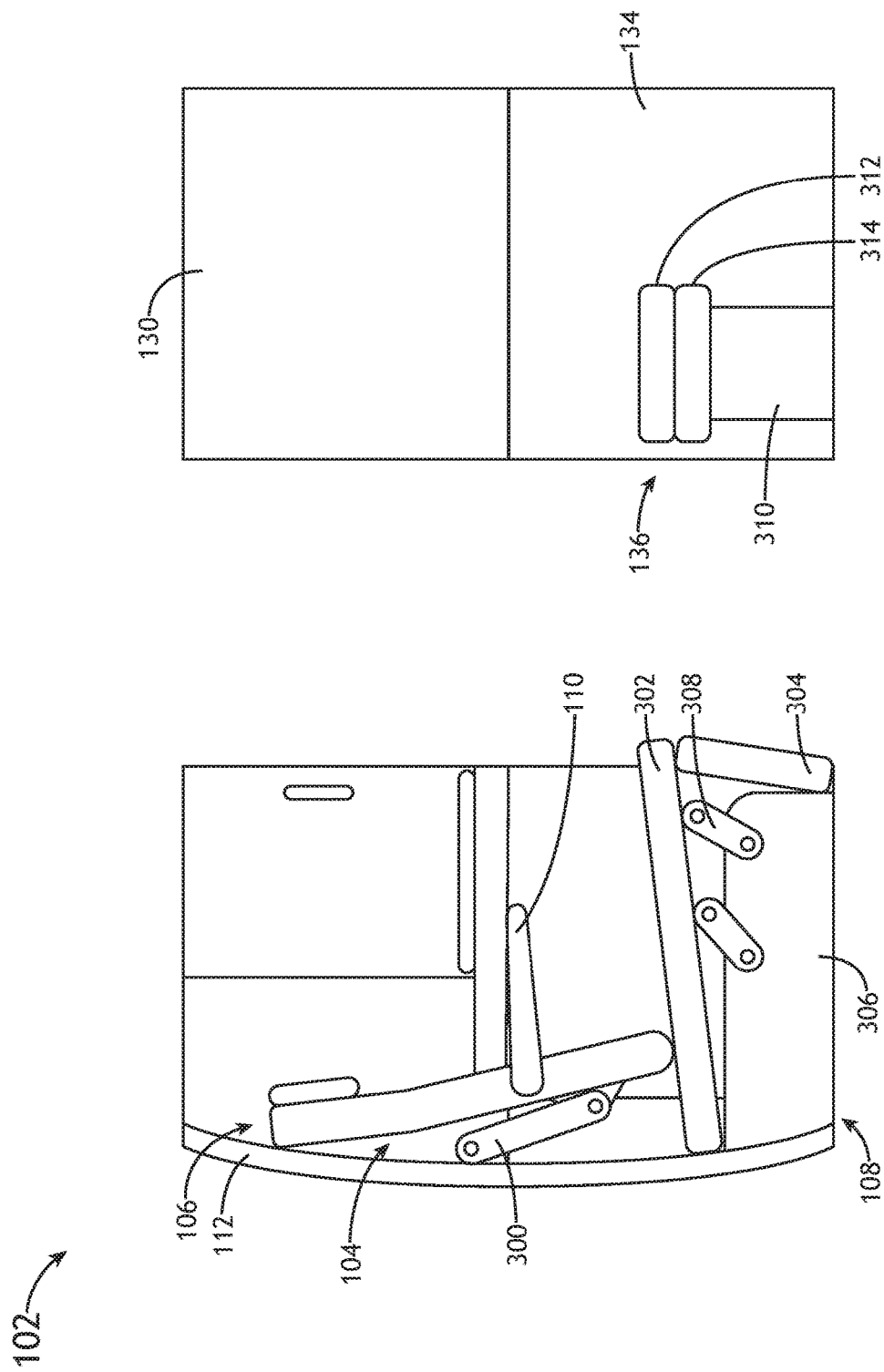
FIG. 3A illustrates a side view of a passenger compartment housing an aircraft seat with a separated seat back and seat pan, in accordance with one or more embodiments of the disclosure.
Figure 3B:
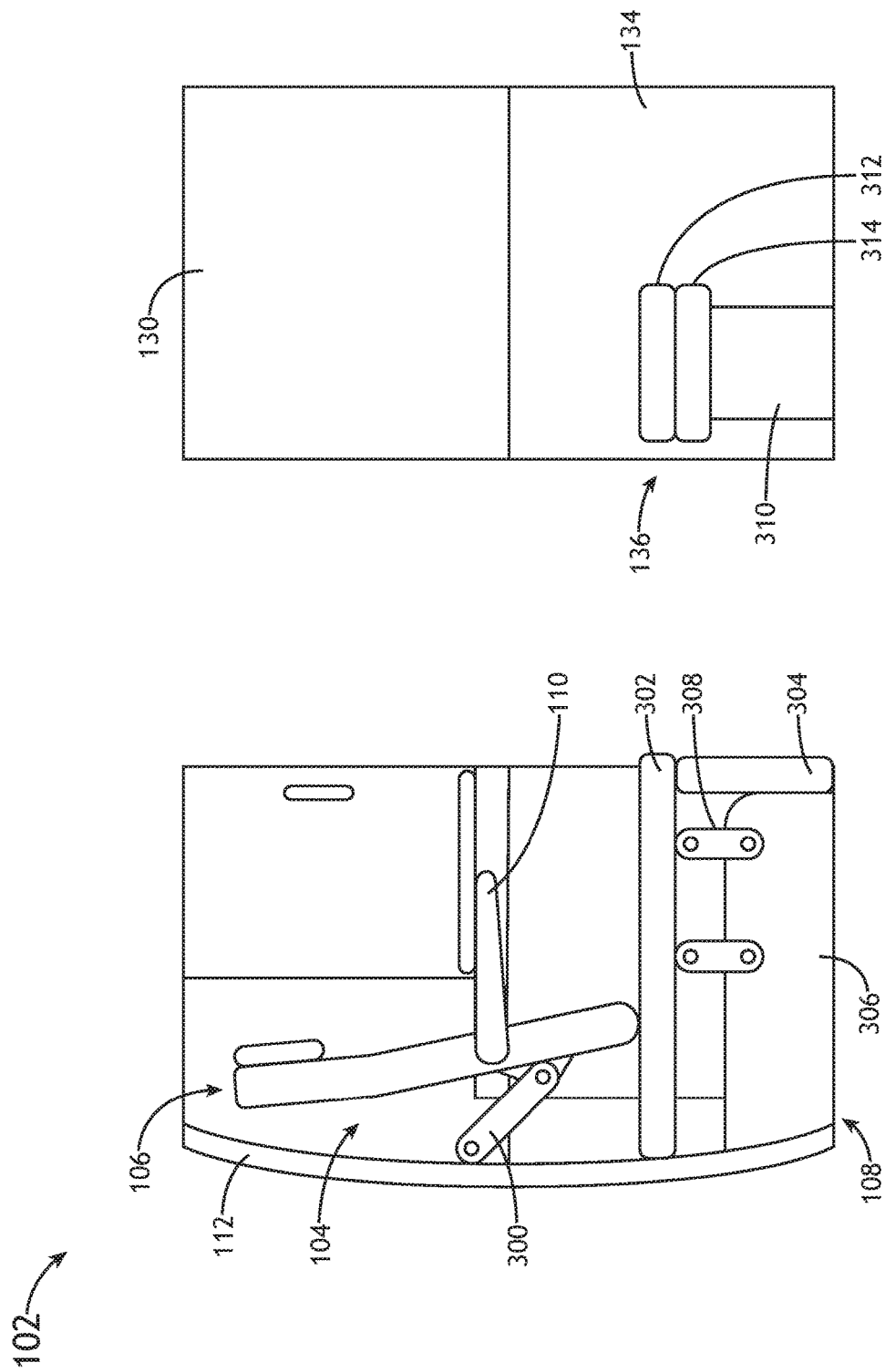
FIG. 3B illustrates a side view of a passenger compartment housing an aircraft seat with a separated seat back and seat pan, in accordance with one or more embodiments of the disclosure.
Figure 3C:
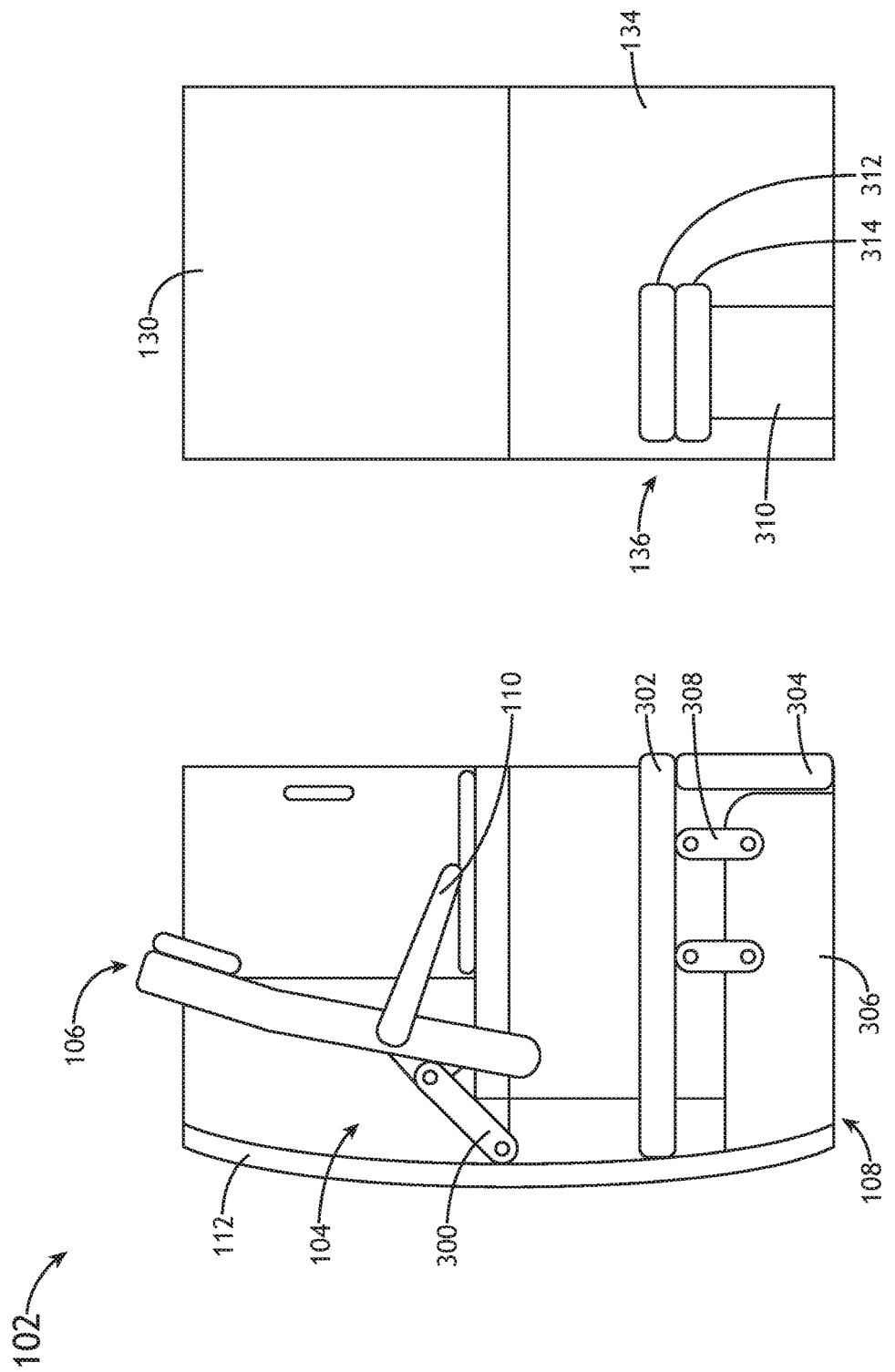
FIG. 3C illustrates a side view of a passenger compartment housing an aircraft seat with a separated seat back and seat pan, in accordance with one or more embodiments of the disclosure.
Figure 3E:
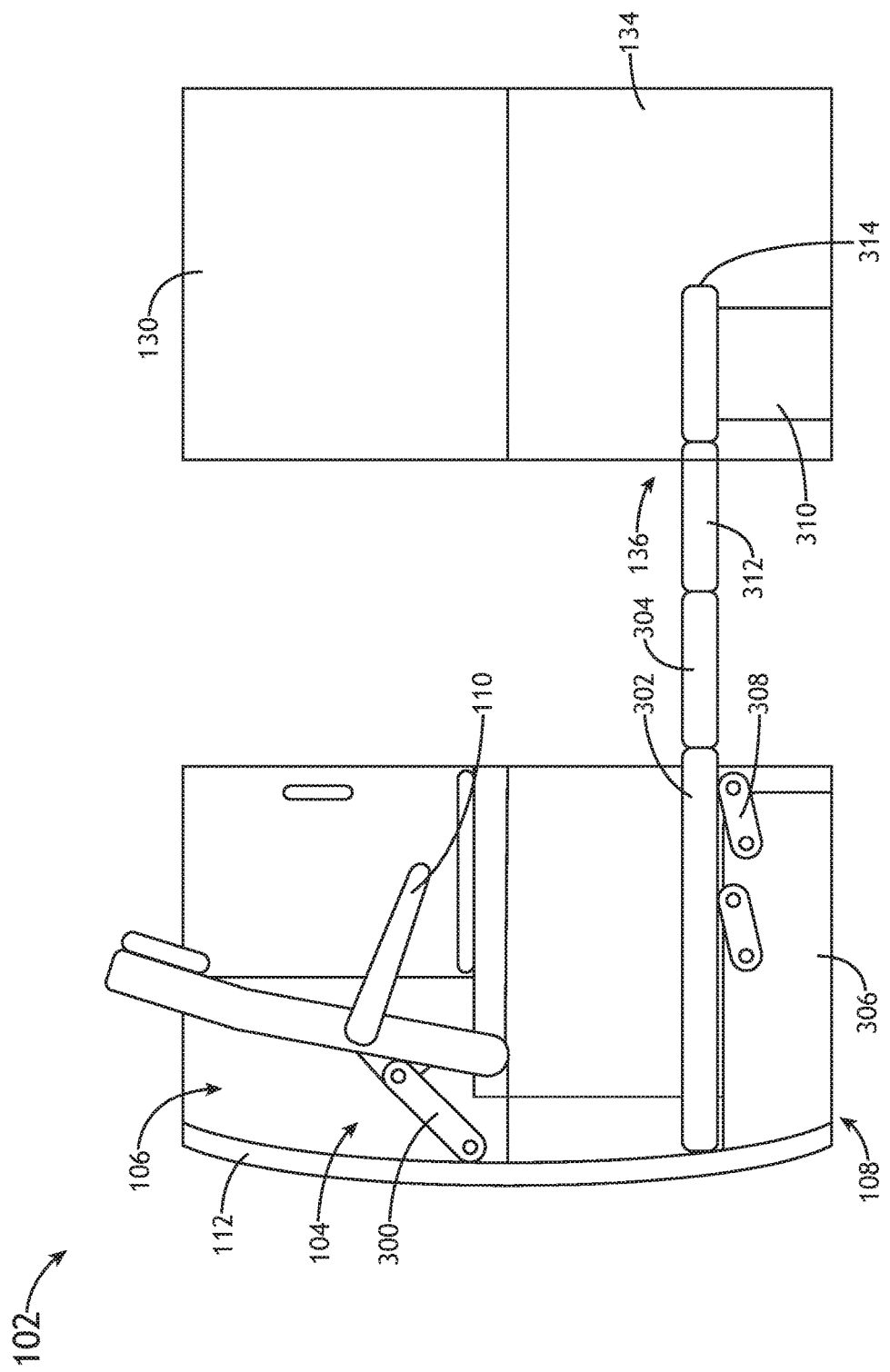
FIG. 3E illustrates a side view of a passenger compartment housing an aircraft seat with a separated seat back and seat pan, in accordance with one or more embodiments of the disclosure.

FIGS. 3A-3E illustrate one example transition between the recline position, the upright position, and the lie-flat position for the aircraft seat 104. In FIG. 3A, the seat back 106, and the seat pan 108 are illustrated in a recline position. In FIG. 3B, the seat back 106 and the seat pan 108 are illustrated in an upright position. In FIG. 3C, the seat back 106 is in a raised position or a sideways-translated position, while the seat pan 108 is in the upright position. In FIG. 3D, the seat back 106 is in the raised position or the sideways-translated position, and the seat pan 108 is in a lie-flat position with the seat pan cushions 302, 304 being arranged in the lie-flat position. In FIG. 3E, the seat back 106 is in the raised position or the sideways-translated position, the seat pan 108 is in the lie-flat position with the seat pan cushions 302, 304 being arranged in the lie-flat position, and the ottoman 136 is in the lie-flat position with the ottoman cushions 312, 314 being arranged in the lie-flat position (e.g., such that the seat pan cushions 302, 304 may be considered aligned with each other and with the ottoman cushions 312, 314 (which may also be considered aligned with each other)).

FIGS. 4A-4E illustrate the passenger compartment 102 including the aircraft seat 104 with the separated seat back 106 and the seat pan 108, in accordance with one or more embodiments of the disclosure.

The seat back 106 may be coupled to the passenger compartment 102 via a set of linkages 400. For example, the set of linkages 400 may include a four-bar linkage assembly 400. The seat back 106 may be coupled to the rear shell 112 of the passenger compartment 102 via the set of linkages 400. For example, the seat back 106 may actuate upward when transitioning between a recline position/an upright position and a lie-flat position via the set of linkages 400. The seat back 106 may be coupled to the side shell 114 of the passenger compartment 102. For example, the seat back 106 may actuate sideways when transitioning between a recline position/an upright position and a lie-flat position via the set of linkages 400. It is noted herein that actuating the seat back 106 upwards or sideways may provide an occupying passenger more head room when using the aircraft seat 104 in the lie-flat position.

The seat pan 108 may include a set of seat pan cushions. For example, the seat pan 108 may include a first seat pan cushion 402, where the first seat pan cushion 402 may form both a portion of the seat pan cushion (e.g., on which an occupying passenger may sit) when the aircraft seat 104 is in the upright position/recline position, as well as a bed cushion when the aircraft seat 104 is in the lie-flat position. By way of another example, the seat pan 108 may include a second seat pan cushion 404, where the second seat pan cushion 404 may be a bed infill cushion used when the aircraft seat 104 is in the lie-flat position. For instance, the second seat pan cushion 404 may be located on the seat pan 108 underneath the first seat pan cushion 402, and may be available for use when the first seat pan cushion 402 is rotated from the recline position/the upright position to the lie-flat position. In addition, different sides of the first seat pan cushion 402 may be used by the occupying passenger, depending on the position of the aircraft seat 104. The first seat pan cushion 402 and the second seat pan cushion 404 may be stacked when the aircraft seat 104 is in the upright position or the recline position (e.g., such that the first seat pan cushion 402 and the second seat pan cushion 404 may be considered unaligned).

The seat pan 108 may include a seat base 406. The seat base 406 may be coupled to one or more floor fittings within a floor of the aircraft cabin 100. The seat base 406 may be configured to rotate (e.g., tilt a rear edge downward) about an axis through a side of the seat base 406 when the aircraft seat 104 is transitioned into the recline position. For example, the seat base 406 may be configured to rotate about the axis during translation of the aircraft seat 104 forward and/or rearward. The seat base 406 may be translatable within the passenger compartment 102 (e.g., via the one or more floor fittings and/or via one or more translatable brackets or rail assemblies coupled to the floor fittings). It is noted herein, however, that the seat base 406 may be fixed in place within the passenger compartment 102. The seat base 406 may be exposed or at least partially covered by a shroud. For example, the shroud may be formed from one or more shroud sections. It is noted herein, however, that the seat pan 108 may be directly coupled to the one or more floor fittings within the floor of the aircraft cabin 100.

The seat pan 108 may be coupled to the seat base 406 via a set of linkages 408. For example, the set of linkages 408 may include a four-bar linkage 408. By way of another example, the seat pan 108 may slightly tilt when transitioning between the recline position and the upright position via the set of linkages 408. By way of another example, the seat pan 108 may translate rearward when transitioning between the recline position/the upright position and the lie-flat position via the set of linkages 408.

The ottoman 136 may include an ottoman base 410. The ottoman base 410 may be coupled to one or more floor fittings within a floor of the aircraft cabin 100. The ottoman base 410 may be translatable within the footwell 134 of the passenger compartment 102 (e.g., via the one or more floor fittings and/or via one or more translatable brackets or rail assemblies coupled to the floor fittings). It is noted herein, however, that the ottoman base 410 may be fixed in place within the footwell 134 of the passenger compartment 102. The ottoman base 410 may be exposed or at least partially covered by a shroud. For example, the shroud may be formed from one or more shroud sections. It is noted herein, however, that the ottoman base 410 may be directly coupled to the one or more floor fittings within the floor of the aircraft cabin 100.

The ottoman 136 may include a set of one or more ottoman cushions. For example, the ottoman 136 may include a first ottoman cushion 412, where the first ottoman cushion 412 may form both a portion of a foot rest for a passenger occupying the aircraft seat 104 while the aircraft seat 104 is in the upright position or the recline position, as well as a bed cushion used when the aircraft seat 104 is in the lie-flat position.

It is noted herein that having the bulk of the bed being generated from the seat pan cushions 402, 404 may allow for the ottoman 136 to only include a single ottoman cushion 412. To ensure the height of the bed is constant, the single ottoman cushion 412 may be positioned lower than the seat pan cushions 402, 404 when the aircraft seat 104 is in the upright position or the recline position. In this regard, the ottoman 136 may be more comfortable to use when the aircraft seat 104 is in the upright position or the recline position.

Figure 4A:
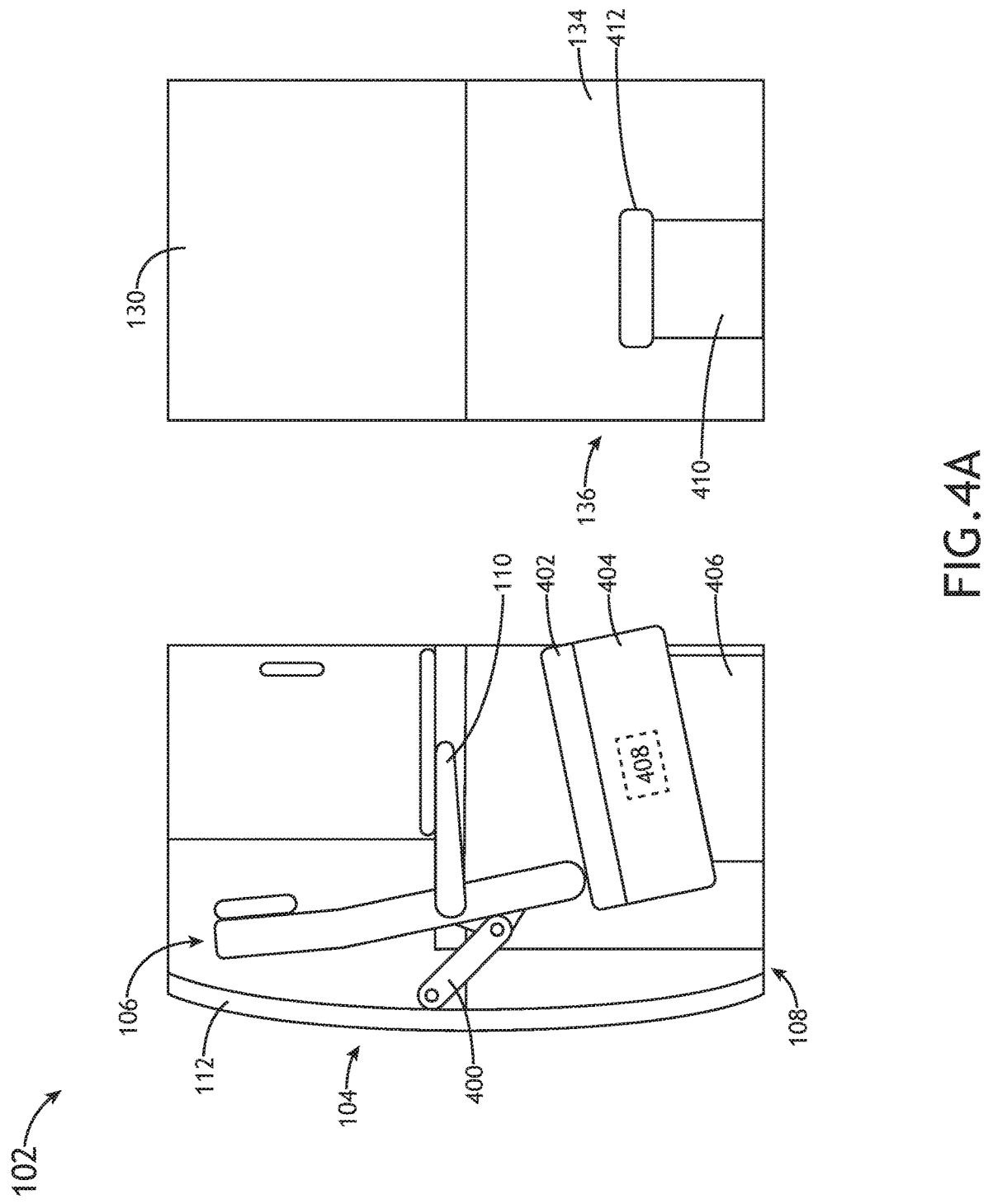
FIG. 4A illustrates a side view of a passenger compartment housing an aircraft seat with a separated seat back and seat pan, in accordance with one or more embodiments of the disclosure.
Figure 4B:
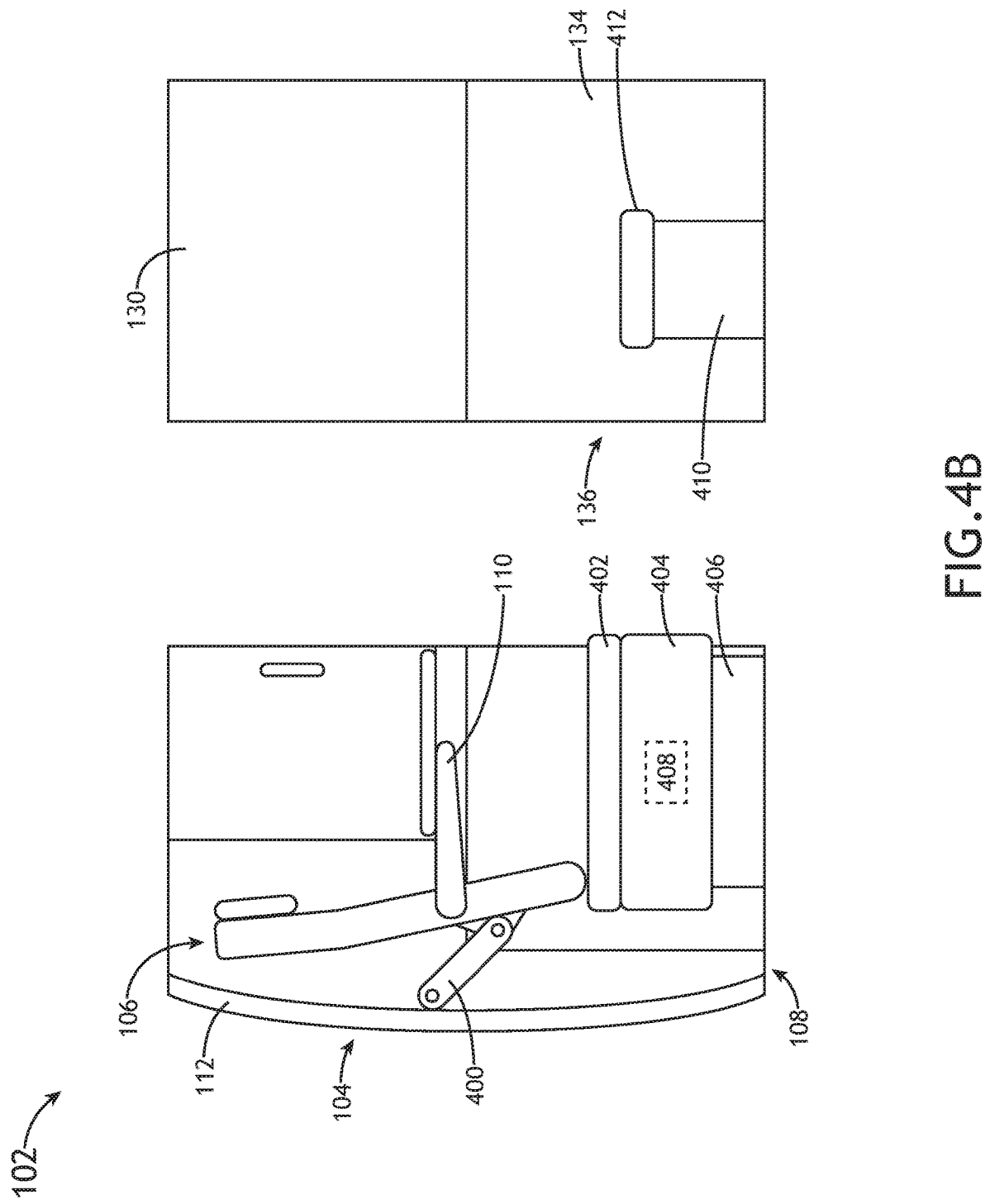
FIG. 4B illustrates a side view of a passenger compartment housing an aircraft seat with a separated seat back and seat pan, in accordance with one or more embodiments of the disclosure.
Figure 4C:
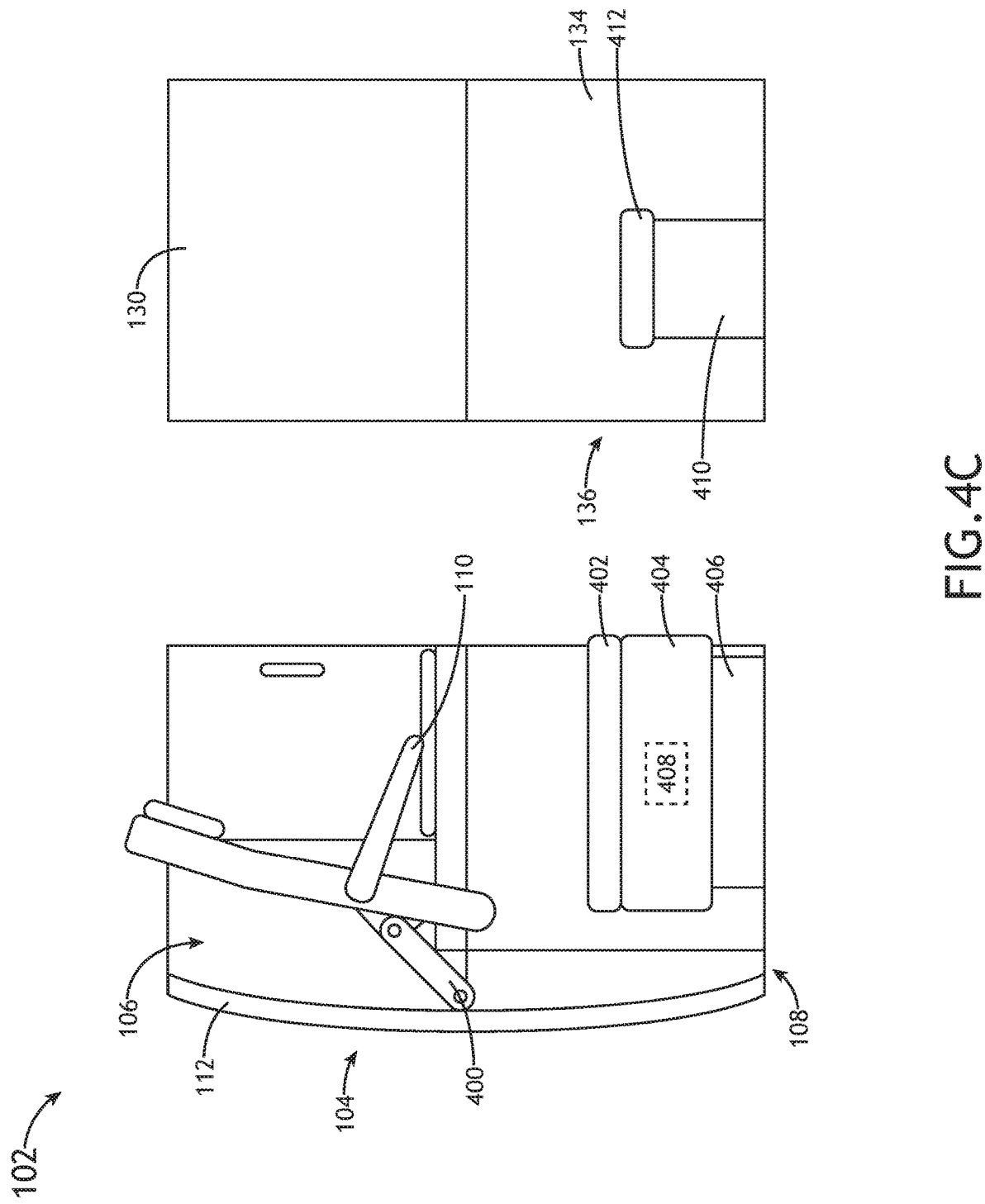
FIG. 4C illustrates a side view of a passenger compartment housing an aircraft seat with a separated seat back and seat pan, in accordance with one or more embodiments of the disclosure.
Figure 4E:
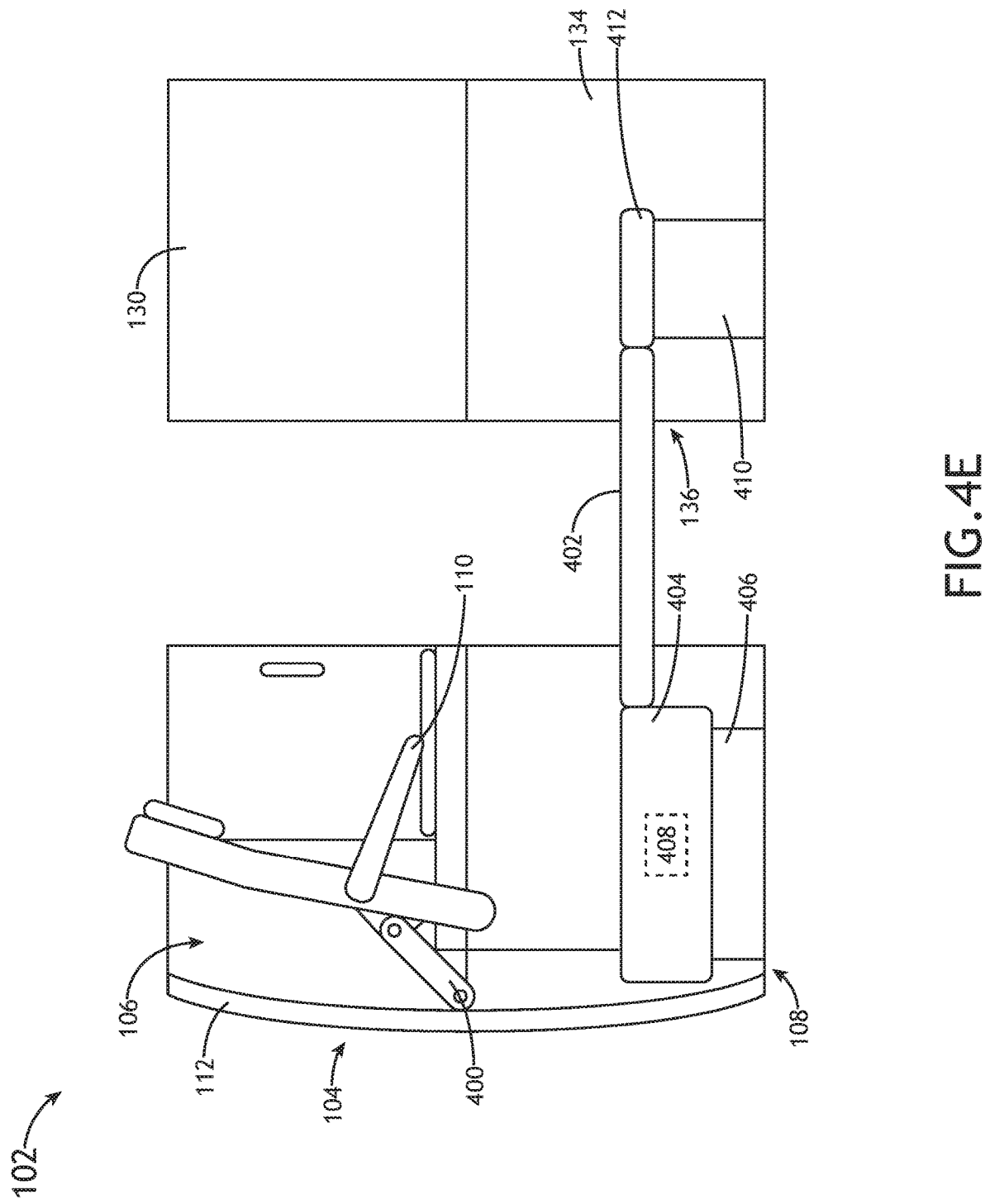
FIG. 4E illustrates a side view of a passenger compartment housing an aircraft seat with a separated seat back and seat pan, in accordance with one or more embodiments of the disclosure.

FIGS. 4A-4E illustrate one example transition between the recline position, the upright position, and the lie-flat position for the aircraft seat 104. In FIG. 4A, the seat back 106 and the seat pan 108 are illustrated in a recline position. In FIG. 4B, the seat back 106 and the seat pan 108 are illustrated in an upright position. In FIG. 4C, the seat back 106 is in a raised position or a sideways-translated position, while the seat pan 108 is in the upright position and in a forward position. In FIG. 4D, the seat back 106 is in the raised position or the sideways-translated position, and the seat pan 108 is in the upright position and in a rearward position. In FIG. 4E, the seat back 106 is in the raised position or the sideways-translated position and the seat pan 108 is in the lie-flat position with the seat pan cushions 402, 404 being arranged in the lie-flat position (e.g., such that the seat pan cushions 402, 404 may be considered aligned with each other and with the ottoman cushion 412).

As illustrated in FIGS. 3A-3E and 4A-4E, the seat back 106 may be in contact with a top surface of the seat pan 108 when the aircraft seat 104 is in a first position (e.g., the recline position or the upright position), and may be separated from the top surface of the seat pan 108 when the aircraft seat 104 is in a second position (e.g., the lie-flat position). Separating the seat back 106 from the seat pan 108 may allow for greater freedom in designing the seat back 106 shape relative to the shape of the passenger compartment 102 (e.g., the rear shell 112 and/or the side shell 114), as the seat back 106 is not required to conform to a limiting set of seat kinematics. The separated nature of the seat back 106 (e.g., being coupled to the rear shell 112 or the side shell 114) and the seat pan 108 (e.g., being coupled to the floor of the aircraft cabin 100) may result in the seat back 106 being configured to move independently of the seat pan 108 when the aircraft seat 104 transitions between the first position and the second position (and vice versa). It is noted herein that at least one of the seat back 106 or the seat pan 108 may be configured to move independently of the ottoman 136 when the aircraft seat 104 transitions between the first position and the second position.

In addition, as illustrated in FIGS. 3A-3E and 4A-4E, the seat back 106 may be separated by a distance from the seat pan 108 when the seat back 106 is raised or lifted upward when the aircraft seat 104 is in the second position.

Further, as illustrated in FIGS. 3A-3E and 4A-4E, the seat pan 108 may extend behind a plane defined by a surface of the seat back 106 (or extend beyond the point where the seat back 106 interacts with the seat pan 108) into a space of the passenger compartment 102 bounded in part by a shell (e.g., the shell 112 and/or the side shell 114) and a plane defined by a surface of the seat back 106 proximate the rear shell 112. Extending into the space behind a plane defined by a surface of the seat back 106 may result in minimizing the loss of passenger space (e.g., within the footwell 134) after the aircraft seat transitions from the first position to the second position, as the loss of space instead occurs in an inaccessible portion of the passenger compartment 102. In this regard, the seat pan 108 may need to translate a reduced distance (or can remain in place) when the aircraft seat 104 transitions between the upright position or the reclined position and the lie-flat position.

Further, as illustrated in FIGS. 3A-3E and 4A-4E, the seat pan 108 may include at least one cushion (e.g., cushions 302, 304 or cushions 402, 404, respectively) configured to align with at least one cushion of the ottoman 136 (e.g., cushions 312, 314 or cushion 412, respectively) when the aircraft seat 104 is in the lie-flat position.

It is noted herein that the transition of the aircraft seat 104 as provided in the example illustrations of FIGS. 3A-3E and 4A-4E are not limited to the steps and/or sub-steps provided. The transition of the aircraft seat 104 may include more or fewer steps and/or sub-steps. The transition of the aircraft seat 104 may perform the steps and/or sub-steps in an order other than provided. At least some of the steps and/or sub-steps of the transition of the aircraft seat 104 may be performed sequentially or simultaneously. For example, motion may be synchronized between the aircraft seat 104 (e.g., the seat back 106 and the seat pan 108) and the ottoman 136. For instance, the ottoman 136 may return to the lie-flat position when the aircraft seat 104 (e.g., the seat back 106 and the seat pan 108) travels to the lie-flat position. In this regard, the possibility of a collision between the aircraft seat 104 and the ottoman 136 is reduced. Therefore, the above description should not be interpreted as a limitation on the scope of the disclosure but merely an illustration.

Figure 5:
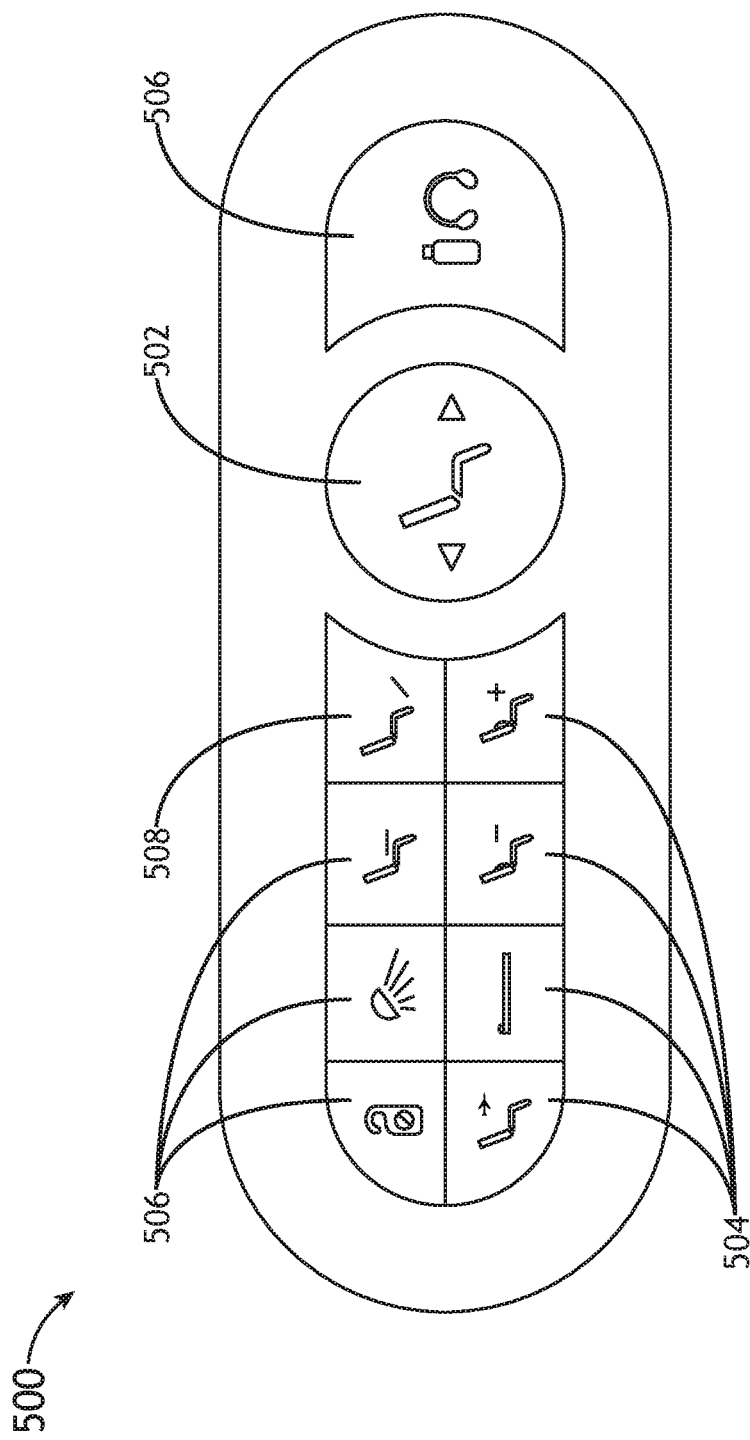
FIG. 5 illustrates a side view of a passenger control unit for a passenger compartment housing an aircraft seat with a separated seat back and seat pan, in accordance with one or more embodiments of the disclosure.

FIG. 5 illustrates a side view of a passenger control unit 500 for the passenger compartment 102 including the aircraft seat 104 with the separated seat back 106 and the seat pan 108, in accordance with one or more embodiments of the disclosure.

Figure 1C:
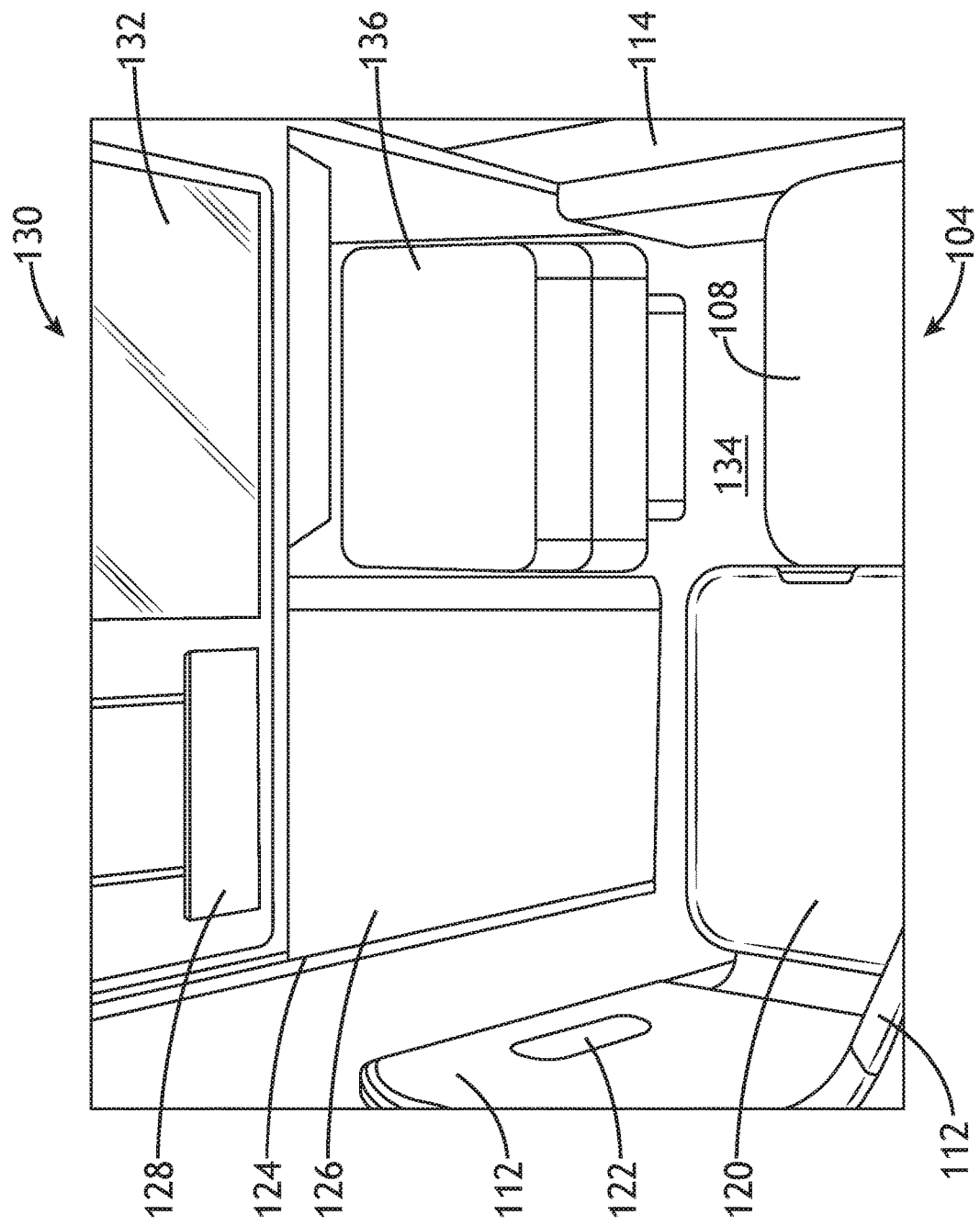
FIG. 1C illustrates a perspective view of a passenger compartment housing an aircraft seat with a separated seat back and seat pan, in accordance with one or more embodiments of the disclosure.
Figure 2A:
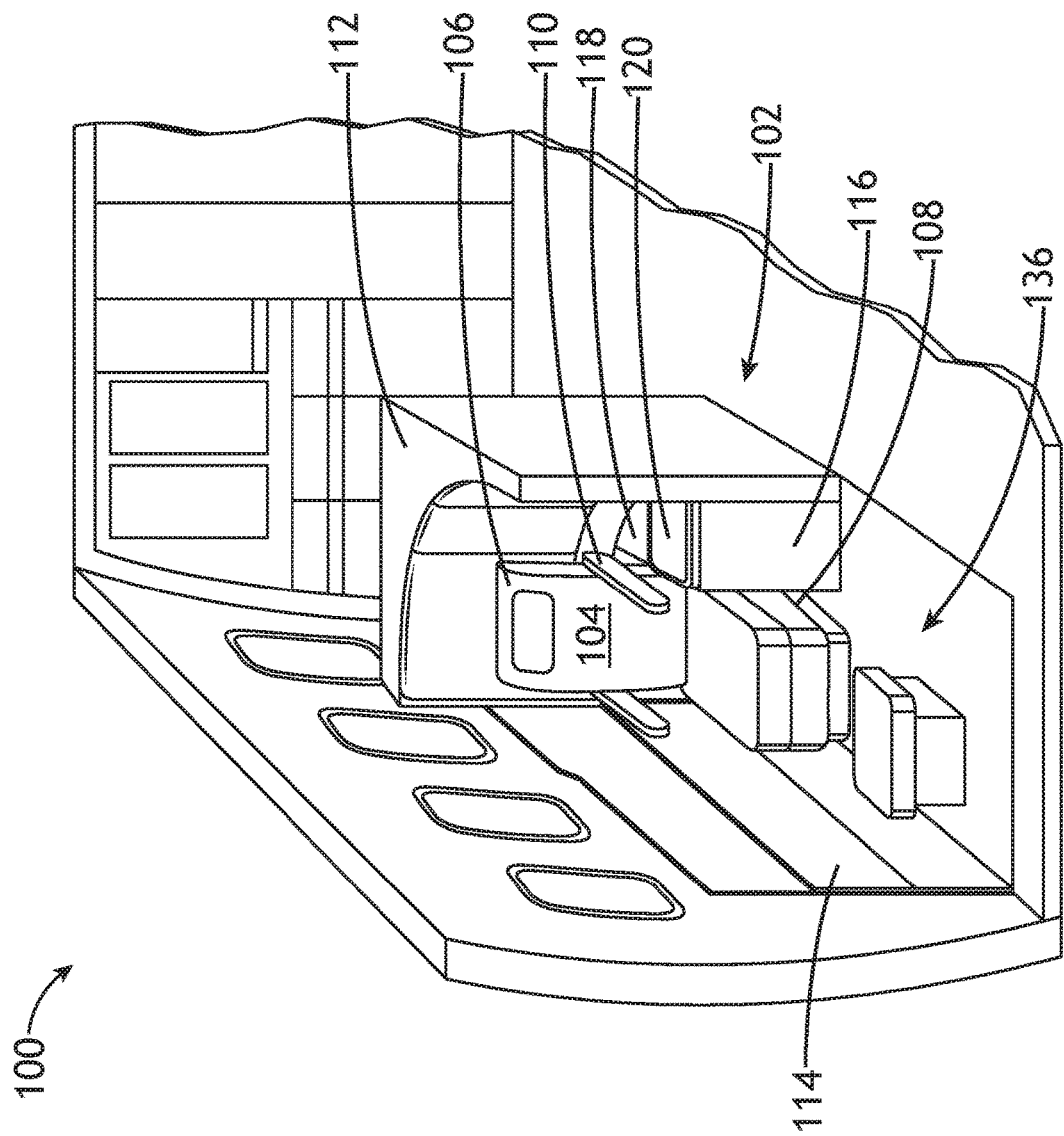
FIG. 2A illustrates a perspective view of an aviation environment including a passenger compartment housing an aircraft seat with a separated seat back and seat pan, in accordance with one or more embodiments of the disclosure.
Figure 2B:
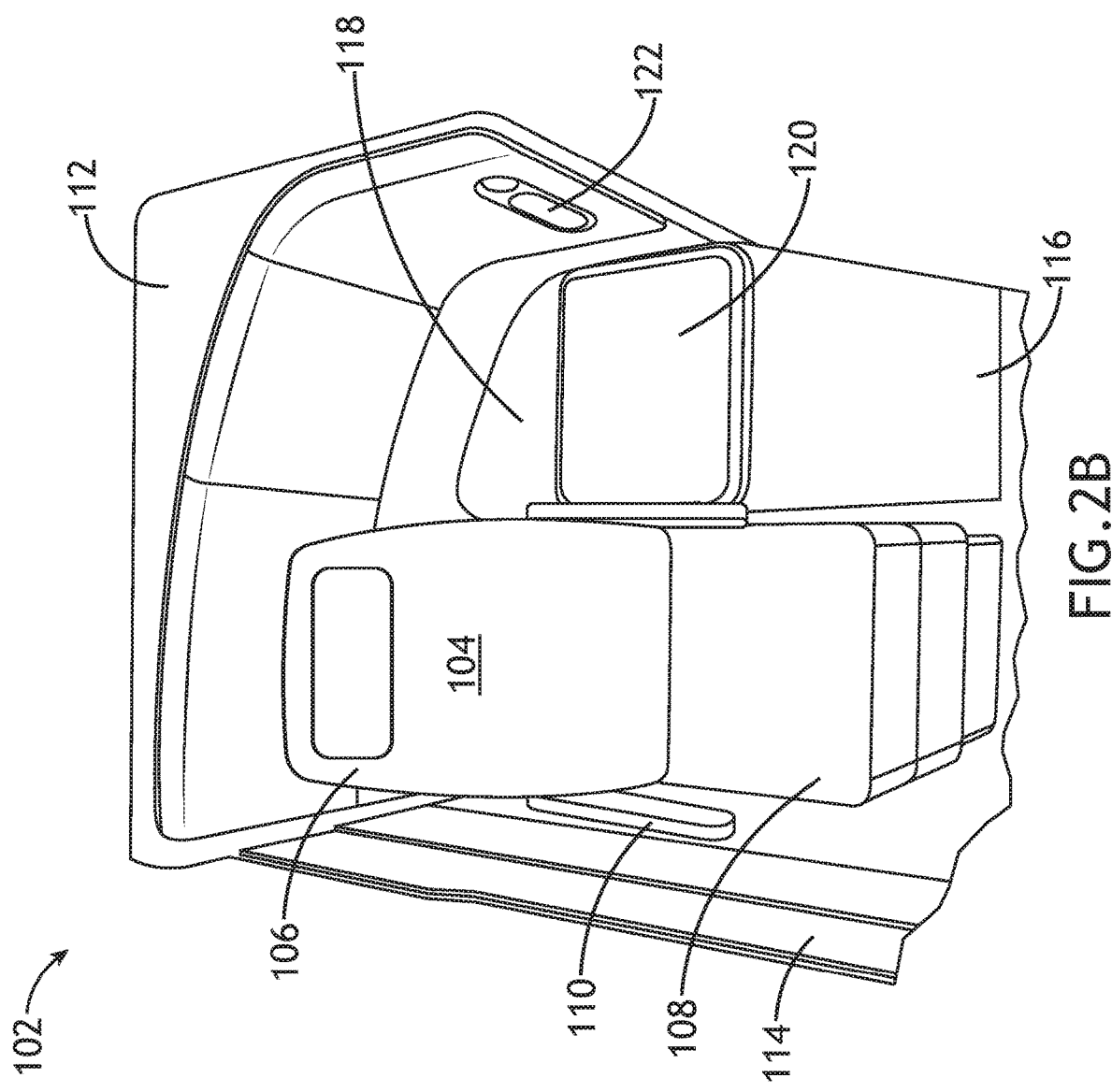
FIG. 2B illustrates a perspective view of a passenger compartment housing an aircraft seat with a separated seat back and seat pan, in accordance with one or more embodiments of the disclosure.
Figure 2C:
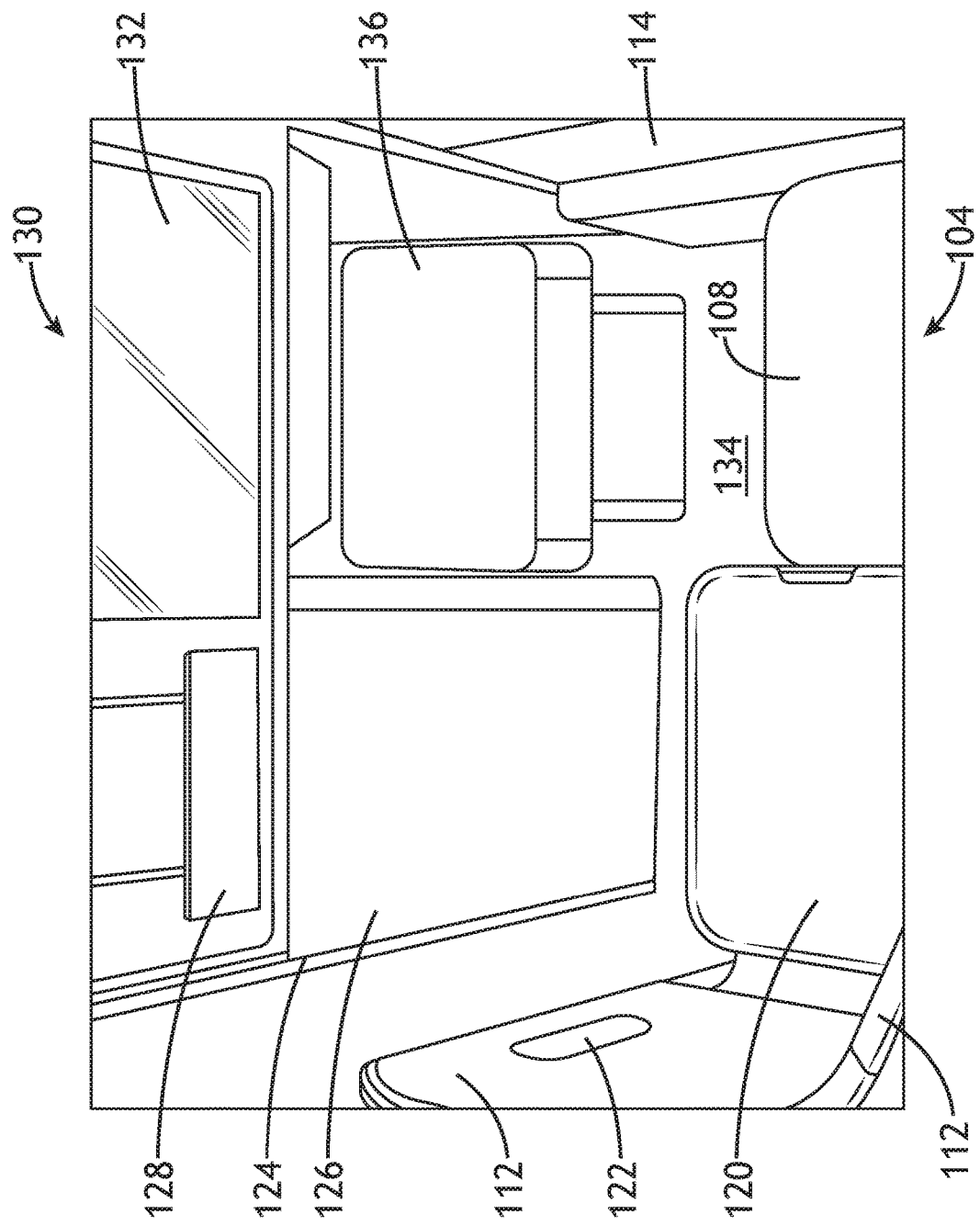
FIG. 2C illustrates a perspective view of a passenger compartment housing an aircraft seat with a separated seat back and seat pan, in accordance with one or more embodiments of the disclosure.

The passenger control unit 500 may be coupled to a surface within the passenger compartment 102 (e.g., the passenger compartment 102 illustrated in FIGS. 1A-1C). For example, the passenger control unit 500 may be mounted on or at least be partially inset within a surface of the aircraft seat 104 or the ottoman 136 (e.g., as illustrated in FIGS. 1A-4E). By way of another example, the passenger control unit 500 may be mounted on a surface or at least be partially inset within of a shell piece (e.g., rear shell 112, side shell 114, front shell 130, as illustrated in FIGS. 1A-4E) or a monument 116 (e.g., as illustrated in FIGS. 1A-4E).

It is noted herein the raising or sideways-translating of the seat back 106 via the set of linkages 300 (e.g., as illustrated in FIGS. 3A-3E) or the set of linkages 400 (e.g., as illustrated in FIGS. 4A-4E), the transitioning of the seat pan 108 between the recline position, the upright position, and the lie-flat position via the set of linkages 308 (e.g., as illustrated in FIGS. 3A-3E) or the set of linkages 408 (e.g., as illustrated in FIGS. 4A-4E), and/or the translation and/or rotation of the ottoman 136 may be at least partially assisted by one or more actuation devices. For example, the one or more actuation devices may include, but is not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies (e.g., a worm gear-and-wheel assembly, a rack-and-pinion assembly, or the like), one or more chain-and-sprocket assemblies, one or more belt-and-pulley assemblies, or the like).

As such, the passenger control unit 500 may include one or more seat toggle switches 502. For example, a seat toggle switch 502 of the one or more seat toggle switches 502 may be configured to translate the aircraft seat 104 forward and/or rearward, where the aircraft seat 104 is fully positionable via translation between the outer limits of motion as defined by the moveable components of the aircraft seat 104.

The passenger control unit 500 may include one or more seat switches 504. For example, a switch 504 of the one or more seat switches 504 may be configured to recline or raise the aircraft seat 104, where the aircraft seat 104 is fully positionable via rotation between the outer limits of motion as defined by the moveable components of the aircraft seat 104. By way of another example, a switch 504 of the one or more seat switches 504 may be configured to re-position the aircraft seat 104 into a lay-flat position. By way of another example, a switch 504 of the one or more seat switches 504 may be configured to re-position the aircraft seat 104 into the upright position (e.g., a TTOL position).

The passenger control unit 500 may include one or more passenger compartment switches 506. For example, a switch 506 of the one or more passenger compartment switches 506 may toggle the one or more lights 122 (e.g., as illustrated in FIGS. 1A-4E). By way of another example, a switch 506 of the one or more passenger compartment switches 506 may signal to cabin crew that the passenger does not wish to be disturbed for a period of the flight. It is noted herein the one or more passenger compartment switches 506 may be a cover or dust plug for one or more electronics connectors including, but not limited to, one or more headphone jacks, one or more universal serial bus (USB) ports, one or more power outlets, or the like.

The passenger control unit 500 may include one or more ottoman switches 508. Depressing an ottoman switch 508 of the one or more ottoman switches 508 may re-position the ottoman 136 and/or unlock the capability of the ottoman 136 to linearly translate, where the ottoman 136 is fully positionable via translation between the outer limits of motion as defined by the moveable components of the ottoman 136. It is noted herein that depressing an ottoman switch 508 of the one or more ottoman switches 508 may unlock the capability of the ottoman 136 to rotate, where the ottoman 136 is fully positionable via rotation between the outer limits of motion as defined by the moveable components of the ottoman 136.

Figure 6:
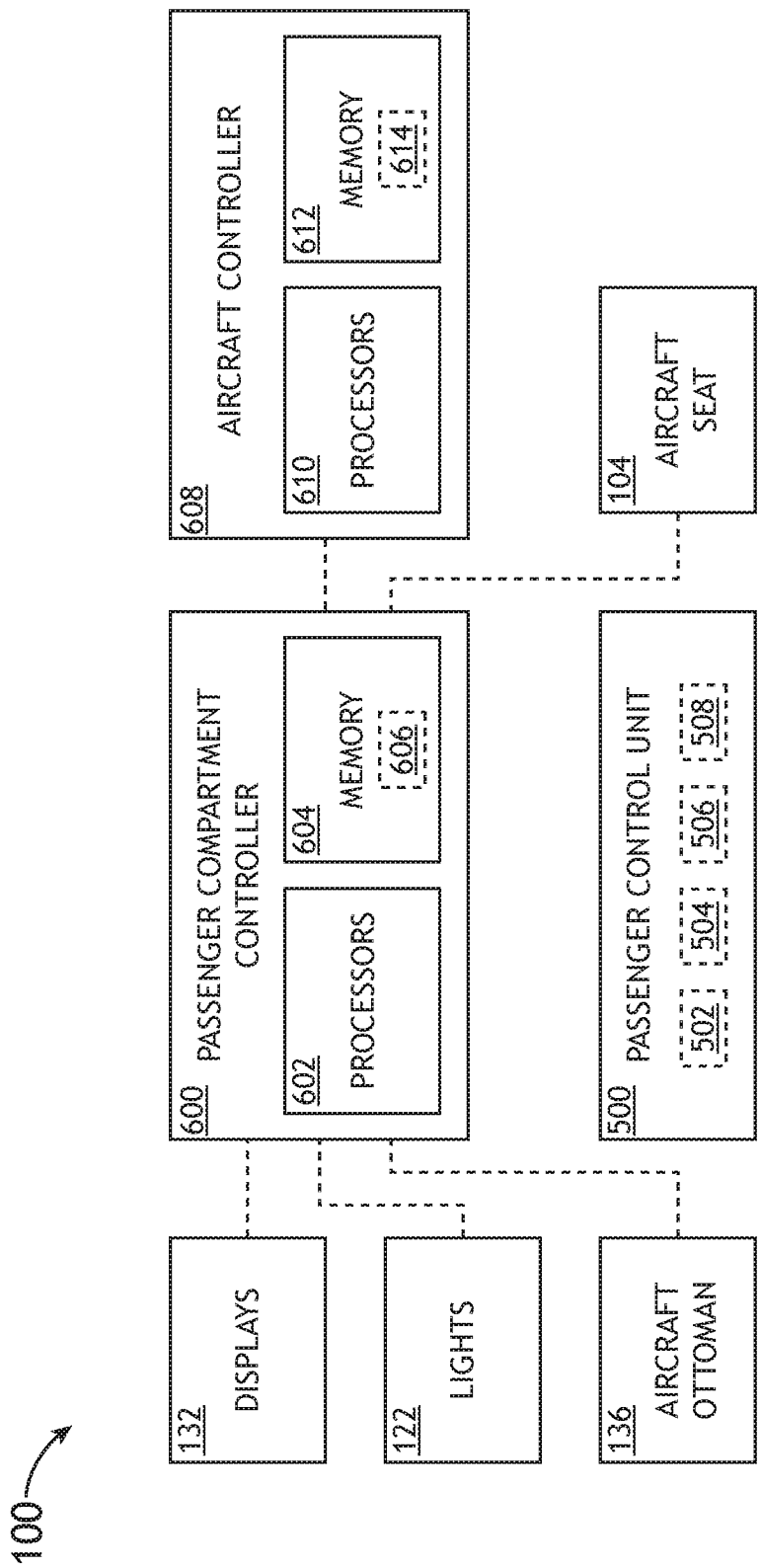
FIG. 6 illustrates a block diagram of an aviation environment including a passenger compartment housing an aircraft seat with a separated seat back and seat pan, in accordance with one or more embodiments of the disclosure.

FIG. 6 illustrates a block diagram of the aviation environment 100 housing the aircraft seat 104, in accordance with one or more embodiments of the disclosure.

The aviation environment 100 (e.g., aircraft 100, aircraft cabin 100, or the like) may include one or more passenger compartment controllers 600 (e.g., within the passenger compartment 102 as illustrated in FIGS. 1A-4E). The one or more passenger compartment controllers 600 may include one or more processors 602 and memory 604. The memory 604 may store one or more sets of program instructions 606. The one or more processors 602 may be configured to execute the one or more sets of program instructions 606 to carry out one or more of the various steps described throughout the present disclosure.

The one or more passenger compartment controllers 600 may be coupled (e.g., physically and/or communicatively coupled) to components within the passenger compartment 102 including, but not limited to, the aircraft seat 104, the one or more lights 122, the one or more displays 132, the aircraft ottoman 136, and/or the passenger control unit 500. For example, one or more signals may be transmitted and/or received between the aircraft seat 104, the one or more lights 122, the one or more displays 132, the aircraft ottoman 136, and/or the passenger control unit 500. For instance, a signal may be generated via the toggling of a switch 502 and/or a pressing of a switch 504, 506, 508 on the passenger control unit 500, which may be received and processed by the one or more passenger compartment controllers 600. The one or more passenger compartment controllers 600 may then transmit the processed one or more signals to an intended end point (e.g., the aircraft seat 104, the one or more lights 122, the one or more displays 132, the aircraft ottoman 136, and/or the passenger control unit 500).

It is noted herein that the passenger control unit 500 may be considered to be at least a portion of the one or more passenger compartment controllers 600. For example, the passenger control unit 500 may be a component of the one or more passenger compartment controllers 600. By way of another example, the passenger control unit 500 may be integrated within the one or more passenger compartment controllers 600. In addition, it is noted herein that the passenger control unit 500 may be considered to include and/or be a passenger seat control unit, for purposes of the present disclosure.

The aircraft cabin 100 may include one or more aircraft controllers 608. The one or more aircraft controllers 608 may include one or more processors 610 and memory 612. The memory 612 may store one or more sets of program instructions 614. The one or more processors 610 may be configured to execute the one or more sets of program instructions 614 to carry out one or more of the various steps described throughout the present disclosure.

The one or more processors 602, 610 may include any one or more processing elements known in the art. In this sense, the one or more processors 602, 610 may include any microprocessor device configured to execute algorithms and/or program instructions. In general, the term "processor" may be broadly defined to encompass any device having one or more processing elements, which execute a set of program instructions from a non-transitory memory medium (e.g., the memory 604, 612), where the one or more sets of program instructions 606, 614 are configured to cause the one or more processors 602, 610 to carry out any of one or more process steps.

The memory 604, 612 may include any storage medium known in the art suitable for storing the one or more sets of program instructions 606, 614 executable by the associated one or more processors 602, 610. For example, the memory 604, 612 may include a non-transitory memory medium. For instance, the memory 604, 612 may include, but is not limited to, a read-only memory (ROM), a random access memory (RAM), a magnetic or optical memory device (e.g., disk), a magnetic tape, a solid state drive, and the like. The memory 604, 612 may be configured to provide display information to the display device (e.g., the one or more displays 132). In addition, the memory 604, 612 may be configured to store user input information from a user input device. The memory 604, 612 may be housed in a common controller housing with the one or more processors 602, 610. The memory 604, 612 may, alternatively or in addition, be located remotely with respect to the spatial location of the processors 602, 610, the one or more passenger compartment controllers 600 and/or the one or more aircraft controllers 608. For instance, the one or more processors 602, 610, the one or more passenger compartment controllers 600, and/or the one or more aircraft controllers 608 may access a remote memory 604, 612 (e.g., server), accessible through a network (e.g., internet, intranet, and the like) via one or more communication interfaces.

The one or more passenger compartment controllers 600 and/or the one or more aircraft controllers 608 may be configured to receive and/or acquire data or information from other systems or tools via the one or more communication interfaces that may include wireline and/or wireless portions. In addition, the one or more passenger compartment controllers 600 and/or the one or more aircraft controllers 608 may be configured to transmit data or information (e.g., the output of one or more procedures of the inventive concepts disclosed herein) to one or more systems or tools via the one or more communication interfaces that may include wireline and/or wireless portions. In this regard, the transmission medium may serve as a data link between the one or more passenger compartment controllers 600, the one or more aircraft controllers 608, and/or other subsystems. In addition, the one or more passenger compartment controllers 600 and/or the one or more aircraft controllers 608 may be configured to send data to external systems via a transmission medium (e.g., network connection).

Although the present disclosure is directed to the one or more passenger compartment controllers 600 and the one or more aircraft controllers 608 being separate, it is noted herein the one or more passenger compartment controllers 600 and the one or more aircraft controllers 608 may be the same and/or share select components. Therefore, the above description should not be interpreted as a limitation on the present disclosure but merely an illustration.

The one or more displays 132 may include any display device known in the art. For example, the one or more displays 132 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more input devices may include any user input device known in the art. For example, the one or more input devices may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more displays 132 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more displays 132 being indirectly coupled to the corresponding one or more input devices indirectly (e.g., via the one or more passenger compartment controllers 600 and/or the one or more aircraft controllers 608), it is noted herein the one or more displays 132 may be directly coupled to the corresponding one or more input devices. For example, the one or more displays 132 may be housed with the one or more input devices in a common user interface housing. Therefore, the above description should not be interpreted as a limitation on the present disclosure but merely an illustration.

Although embodiments of the present disclosure illustrate the actuation of components of the aircraft seat 104 via the passenger control panel 500, it is noted herein that one or more components of the aircraft seat 104 may be actuated by engaging a handle that activates one or more mechanical assemblies. Therefore, the above description should not be interpreted as a limitation on the scope of the disclosure but merely an illustration.

Although the present disclosure is directed to the aircraft seat 104 being installed within the aircraft 100 or aircraft cabin 100, it is noted herein the aircraft seat 104 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

It is noted herein, however, that where the aircraft seat 104 is installed within the aircraft 100 or aircraft cabin 100, the aircraft seat 104 may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, comprising:
    a seat back coupled to a shell of one or more passenger compartment shell sections of a passenger compartment installed within an aircraft cabin, the seat back coupled to the shell by a first set of linkages, the linkages having two pivot points, a first pivot point located at the seat back and a second pivot point located at the shell;
    the seat back configured to move from a first seat back position to a second seat back position by the set of linkages; and
    a seat pan coupled to a floor of the aircraft cabin proximate to an ottoman installed within the passenger compartment, the seat pan configured to move from a first seat pan position to a second seat pan position, the seat back being in contact with a surface of the seat pan when the seat back is in the first seat back position and the seat pan is in the first seat pan position, the seat back being separated from the surface of the seat pan when the seat back is in the second seat back position and the seat pan is in the second seat pan position, the seat back being configured to move independently of the seat pan when the seat back transitions between the first seat back position and the second seat back position.

2. The aircraft seat of claim 1, the seat pan further comprising:

at least one seat pan cushion configured to align with at least one ottoman cushion of the ottoman when the seat pan is in the second seat pan position.

3. The aircraft seat of claim 2, the at least one seat pan cushion including a first seat pan cushion and a second seat pan cushion, the first seat pan cushion and the second seat pan cushion being unaligned when the seat pan is in the first seat pan position, the first seat pan cushion and the second seat pan cushion being aligned when the seat pan is in the second seat pan position.

4. The aircraft seat of claim 3, the second seat pan cushion being set at an angle relative to the first seat pan cushion when the seat pan is in the first seat pan position.

5. The aircraft seat of claim 3, the second seat pan cushion being stacked on the first seat pan cushion when the seat pan is in the first seat pan position.

6. The aircraft seat of claim 3, the first seat pan cushion and the second seat pan cushion being aligned with the at least one ottoman cushion when the seat pan is in the second seat pan position.

7. The aircraft seat of claim 6, the at least one ottoman cushion including a first ottoman cushion and a second ottoman cushion, the first seat pan cushion and the second seat pan cushion being aligned with the first ottoman cushion and the second ottoman cushion when the seat pan is in the second seat pan position, the first ottoman cushion and the second ottoman cushion being unaligned with the first seat pan cushion and the second seat pan cushion when the seat pan is in the first seat pan position.

8. The aircraft seat of claim 7, the second ottoman cushion being stacked on the first ottoman cushion when the seat pan is in the first seat pan position.

9. The aircraft seat of claim 1, the seat back and the seat pan being separated by a select distance when the seat pan is in the second seat pan position and the seat back is in the second seat back position.

10. The aircraft seat of claim 1, the seat pan configured to extend into a space of the passenger compartment, the space bounded in part by the shell of the passenger compartment and a plane defined by a surface of the seat back.

11. The aircraft seat of claim 1, the first seat pan position including at least one of an upright position or a recline position, the second seat pan position including a lie-flat position.

12. The aircraft seat of claim 11, the seat pan configured to rotate about an axis through a side of a seat pan base to transition between the upright position and the recline position.

13. The aircraft seat of claim 12, the seat pan configured to rotate about the axis through the side of the seat pan base to transition between the upright position and the recline position during a translation of the aircraft seat.

14. The aircraft seat of claim 13, at least one of the seat back or the seat pan being configured to move independently of the ottoman when the seat pan transitions between the first seat pan position and the second seat pan position.

15. The aircraft seat of claim 1, wherein the set of linkages cause the seat back to actuate upward when transitioning between the first seat back position and the second seat back position.

16. A passenger compartment of an aircraft cabin comprising:

one or more passenger compartment shell sections;
an ottoman;
an aircraft seat, comprising:
  a seat back coupled to a shell of the one or more passenger compartment shell sections, the seat back coupled to the shell by a first set of linkages, the linkages having two pivot points, a first pivot point located at the seat back and a second pivot point located at the shell, the seat back configured to move from a first seat back position to a second seat back position by the set of linkages; and
  a seat pan coupled to a floor of the aircraft cabin proximate to the ottoman, the seat pan configured to move from a first seat pan position to a second seat pan position,
  the seat back being in contact with a surface of the seat pan when the seat back is in the first seat back position and the seat pan is in the first seat pan position,
  the seat back being separated from the surface of the seat pan when the seat back is in the second seat back position and the seat pan is in the second seat pan position,
  the seat back being configured to move independently of the seat pan when the seat back transitions between the first seat back position and the second seat back position.

* * * * *